(12) United States Patent
Elberbaum

(10) Patent No.: US 7,461,012 B2
(45) Date of Patent: Dec. 2, 2008

(54) METHOD AND APPARATUS FOR SIMPLIFIED E-COMMERCE SHOPPING VIA HOME SHOPPING TERMINALS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 525 days.

(21) Appl. No.: 10/864,311

(22) Filed: Jun. 8, 2004

(65) Prior Publication Data
US 2005/0273820 A1 Dec. 8, 2005

(51) Int. Cl.
- G06Q 30/00 (2006.01)
- G06F 13/00 (2006.01)
- H04N 7/14 (2006.01)

(52) U.S. Cl. .......................... 705/26; 725/60; 348/14.07
(58) Field of Classification Search ................... 705/26; 725/60; 348/14.07
See application file for complete search history.

(56) References Cited

U.S. PATENT DOCUMENTS

| | | | |
|---|---|---|---|
| 4,905,094 A | 2/1990 | Pocock et al. | |
| 5,430,799 A * | 7/1995 | Katznelson | 380/206 |
| 5,754,637 A | 5/1998 | Choi | |
| 5,923,363 A | 7/1999 | Elberbaum | |
| 6,072,861 A | 6/2000 | Yu | |
| 6,295,513 B1 * | 9/2001 | Thackston | 703/1 |
| 6,543,052 B1 * | 4/2003 | Ogasawara | 725/60 |
| 6,603,842 B2 * | 8/2003 | Elberbaum | 379/106.01 |
| 6,647,305 B1 * | 11/2003 | Bigelow | 700/97 |
| 6,940,957 B2 * | 9/2005 | Elberbaum | 379/106.01 |
| 7,062,454 B1 * | 6/2006 | Giannini et al. | 705/27 |
| 7,194,754 B2 * | 3/2007 | Tomsen et al. | 725/60 |
| 7,237,252 B2 * | 6/2007 | Billmaier | 725/43 |
| 7,367,042 B1 * | 4/2008 | Dakss et al. | 725/60 |
| 2001/0032310 A1 * | 10/2001 | Corella | 713/156 |
| 2002/0073027 A1 * | 6/2002 | Hui et al. | 705/40 |
| 2003/0033388 A1 * | 2/2003 | Hom et al. | 709/220 |

(Continued)

FOREIGN PATENT DOCUMENTS

KR 2002008948 A * 2/2002

OTHER PUBLICATIONS

Anon., "Busy Travellers Can Stop from Their Hotel Rooms," The Straits Times, Jun. 6,1997, p. 51.*

(Continued)

Primary Examiner—Nicholas D Rosen
(74) Attorney, Agent, or Firm—Katten Muchin Rosenman LLP

(57) ABSTRACT

In a method and apparatus for connecting an e-shopping facility such as an e-concierge station or an e-service or an e-merchandise provider including a custom software, with an e-shopping appliance, such as a television interphone monitor or a shopping terminal, or a television receiver including central processing unit and a memory, via a communication network such as a private network, public network or the internet and through an interface unit, wherein e-shopping tenant software programs complementing the custom software of the e-shopping facility are installed into the memory of the central processing unit which enables the central processing unit to select and process orders for e-service and/or e-merchandise on the basis of the installed tenant programs. A shopping signal of a compiled order is generated and propagated between the shopping appliance and the interface unit and processed through the interface unit. An interfaced shopping signal is then communicated between the interface unit and the e-shopping facility.

43 Claims, 15 Drawing Sheets

U.S. PATENT DOCUMENTS

2004/0031058 A1* 2/2004 Reisman .................... 725/112
2004/0131247 A1* 7/2004 Hiwada .................... 382/154
2005/0144642 A1 6/2005 Ratterman
2005/0172330 A1 8/2005 Rathus et al.

OTHER PUBLICATIONS

Anon., "Pidemco Plans 'Wireless' Buildings," The Straits Times, Mar. 9, 2000, p. 62.*

Anon., "Insignia Financial Group Announces Internet Strategy," PR Newswire, Feb. 23, 2000.*

Anon., "MyLackey.Com Debuts Urbanvalet Program at Harbor Steps Apartments," PR Newswire, Aug. 17, 2000.*

Anon., "Rogers Introduces 'One Connection,'" Canada NewsWire, Oct. 20, 2000.*

Anon., "Online Service Takes Parts from Design to Manufacture," Modern Plastics, vol. 81, No. 4, p. 65.*

The Microsoft Press Computer Dictionary, Third Edition, Microsoft Press, Redmond, 1997, p. 66.*

Anon., "CDNet to Launch Cash Dispensing Network for E-Commerce Business," Business Wire, Jan. 24, 2000.*

International Search Report dated Feb. 27, 2006.

Written Opinion of the International Searching Authority dated Feb. 27, 2006.

* cited by examiner

FIG. 13
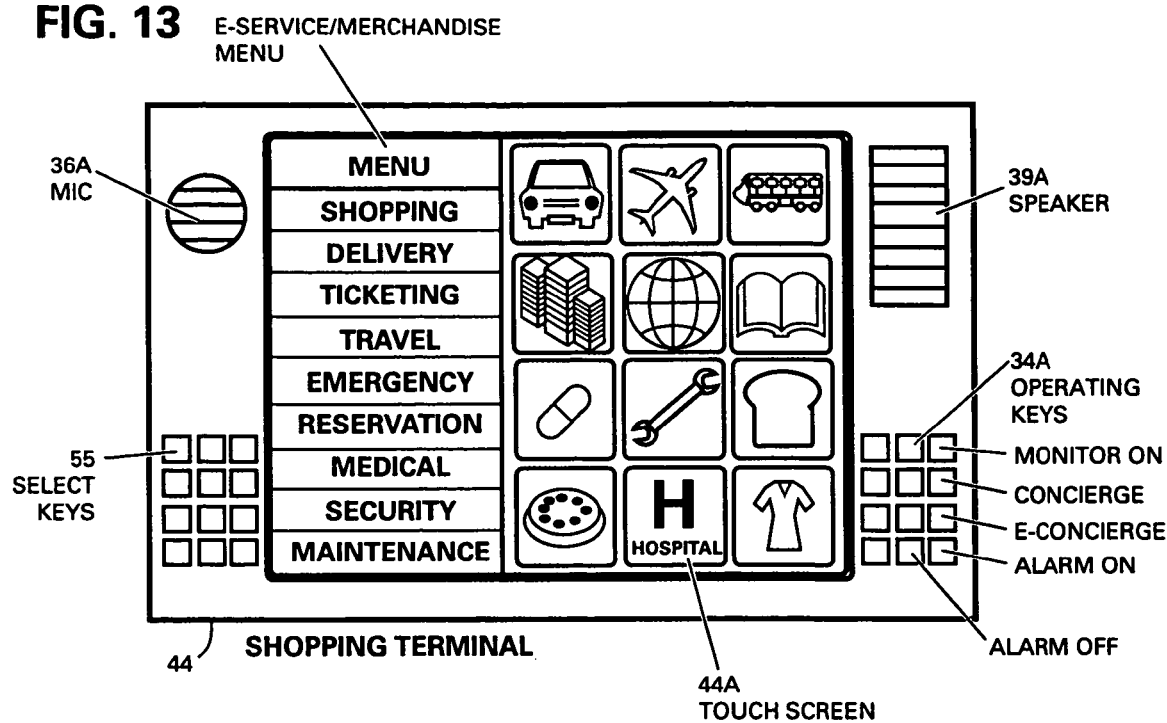
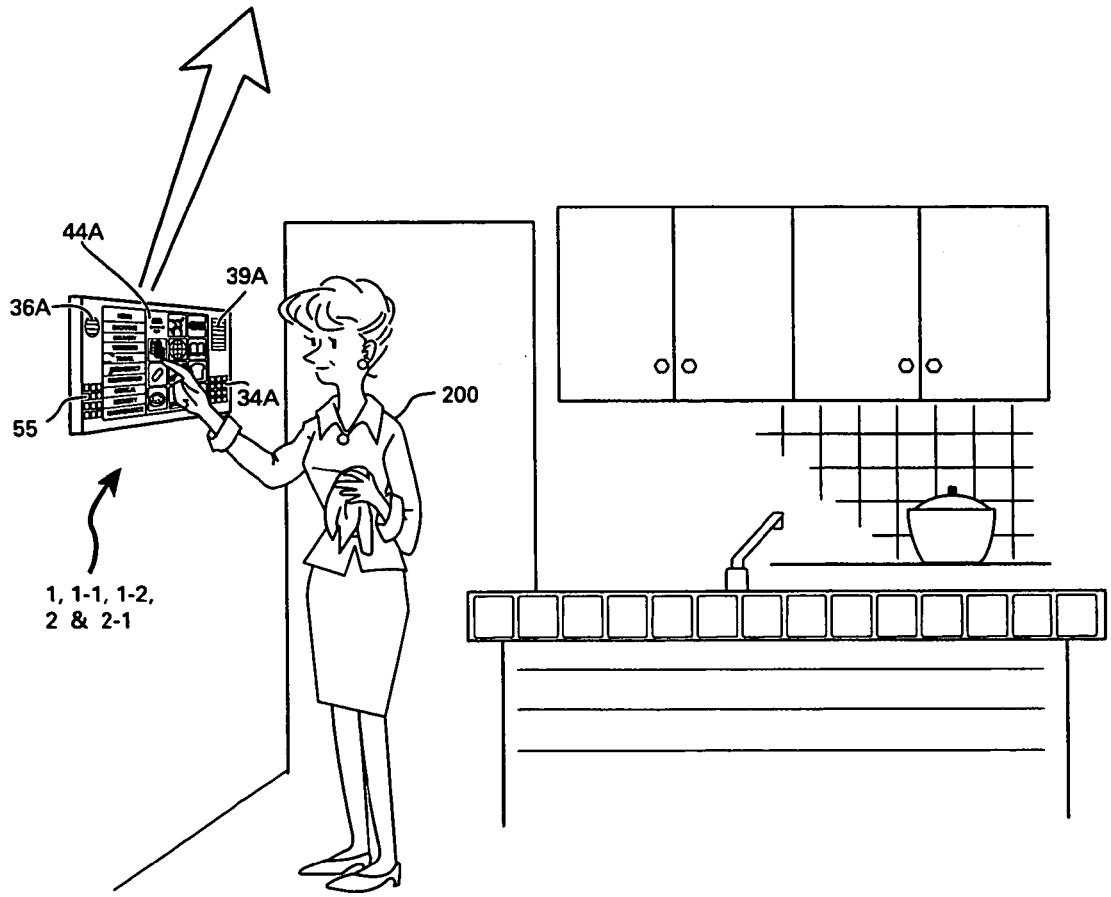

METHOD AND APPARATUS FOR SIMPLIFIED E-COMMERCE SHOPPING VIA HOME SHOPPING TERMINALS

BACKGROUND OF THE INVENTION

1. Field of the Invention

This invention relates to e-commerce shopping via a monitoring terminal of a video interphone system provided for communication between building entrances and individual apartments and to television receivers connected via cable TV and to appliances connected via a network or the internet to an e-service call station and/or e-shopping site.

2. Description of the Prior Art

A television interphone monitor used for entrance-monitoring and communication is usually mounted on a wall inside the apartment, and connected via a matrix selector to a single entry or to a complex multi-entrance system and via an interface unit to an e-concierge station over a network. Such television interphone monitoring system is disclosed in U.S. Pat. No. 6,603,842 B2.

However, such system with multi-entrances along with on-site concierge station or stations and with an interface or a PC for connecting the video interphone system to an e-commerce call center or to an online e-commerce shopping site may have limited capacity and become overloaded, particularly at busy hours, when many visitors to the building address the system and many tenants try to call simultaneously the e-commerce call center or the e-commerce shopping site. Such simultaneous calling may cause caller's queuing and communication processing delays within the building itself or from the building to the network via the system interface.

Some interactive television apparatuses that communicate with television broadcasters and television program providers via cable TV or via their antenna system and/or through the Internet are known as having communication and compatibility problems. Incompatibility and communication problems coupled with the non existing e-commerce standards, overloading of servers and/or the network, the waiting time to access the e-commerce sites and the complex search while trying to shop via the network cause confusion and frustration and this is the main reason for holding back the e-commerce growth.

SUMMARY OF THE INVENTION

An object of the present invention is to provide a method and an apparatus for e-commerce shopping and for processing order for services and/or a merchandise instantly, without delays and with a convenience of voice communications with e-concierge call station, and wherein the e-concierge call station operator may effectively become the tenant's shopping terminal operator, by remotely operating the tenant's terminal as per the tenant's voice inquiries, request and commands.

The "shopping terminal" in the following description may be an apparatus designed for the sole purpose of e-commerce shopping, or it may be a video interphone monitor unit of a video interphone system, or an interactive television apparatus that is connected via a wired or wireless network, or a computer device with a monitor and/or with voice communication capability that is connected via a public or a dedicated network and/or via the internet to e-concierge.

The "e-shopping" in the following description is a general description for electronic shopping, carried via private, public or dedicated network and/or via the internet. The "e-shopping" term may also be used to describe the selecting, processing and ordering of a merchandise and/or services from an e-shopping organization such as an e-concierge.

The "shopping signals" or "shopping communication signals" in the following description is a term used to describe any given signal or combination of signals processed and/or generated for e-shopping, including signals such as television, interactive television, video, audio, data, control, command and alarm signals, including the propagation of the signals for the purpose of processing and ordering merchandise or services through a private, public or dedicated network and/or the internet.

The "e-concierge" in the following description may be an organization for connecting tenants via a private, public or dedicated network and/or the internet for providing the tenants with services and/or a merchandise, or it may be an organization for connecting tenants with e-service and e-merchandise providers via the private, public or dedicated network and/or the internet for providing the tenants with services and/or merchandise supplied by the e-service and e-merchandise providers, or it may be an organization that provides the tenants with services and/or connects the tenants with e-service providers and/or provide the tenants with merchandise and/or connect the tenant with e-merchandise providers.

A "tenant" in the following descriptions is a customer of the e-concierge, for obtaining e-services and/or e-merchandizing from his home or office through an identified shopping terminal, identified by an identification code assigned to it by the e-concierge. A tenant may be connected to the e-concierge via the private, public or dedicated network and/or the Internet directly or through an interface.

"E-service" and "e-merchandise" providers in the following descriptions are organizations that are connected to the tenants via the private, public or dedicated networks and/or the internet and through the e-concierge for providing the tenants with services and merchandise, respectively.

Further, to reduce the costs associated with an operator assisted e-shopping, the shopping terminal can also be operated by the tenant himself and will include a voice activated program for processing of orders and recall of menus on the basis of the tenant voice commands and/or by a touch screen or touch keys and/or by a remote control device, such as a mouse, IR remote control unit or wireless (RF) remote control unit, which are simple to operate.

In the method of the preferred embodiment of the present invention data comprising e-services and e-merchandizing programs including e-services and e-merchandise menus, prices for the services and the merchandise, orders processing, price calculations and billing are stored into one of a memory of the shopping terminal, a memory of the interface unit of the video interphone system, or into a memory of a PC that controls the entire building's video interphone system, or the data are stored the data into the memories of the shopping terminal and/or the interface unit and/or the PC.

The storing of the data of the e-service and e-merchandizing program into the memory of the shopping terminal transforms the shopping terminal into a self contained and self operating e-concierge station, enables the recalling and displaying of the menus and services onto the shopping terminal monitor without delay and for instant processing of the orders, the instant billing of the order and for completing the transaction within the shopping terminal itself, or between the shopping terminal and the interface unit or the PC of the building's video interphone system, thereby, enabling for the final transaction to be carried automatically to the e-concierge, and/or the e-service and/or the e-merchandise provider at an earliest queuing time, within the network timing capacity and limitations.

Another object of the present invention is to provide the shopping terminal, the interface unit or the building's video interphone system PC with CAD (computer aided design) program for processing a selection of items such as apparel, apparel sizes, colors, patterns, designs and shapes and for generating and outputting a display combining the selected items, such as the apparel along with footwear, jewelry or accessories, selected from a variety of pre-programmed or self configured sizes, colors, patterns, designs and shapes.

The shopping terminal with its CAD program can be further used for fitting such items as furniture, lamps, curtains, rugs, ornaments, home accessories and similar décor items for use inside the house, by generating a virtual interior display, on the basis of the e-merchandizing and e-service selection programs combined with one or more pictures of the interior of the home taken by one or more cameras associated with the shopping terminal and the CAD program and providing the tenant with a CAD designed interior display along with his décor selection. This enables the tenant to place into or move around the selected items within the virtual display, for his further reviewing of the fitness of his selection.

Similarly, the fitting of selected items such as apparel, footwear, jewelry and accessories is processed by using the CAD to introduce onto one or more pictures, such as of the tenant body, the tenants legs or the tenant's general appearance, taken by one or more digital cameras associated with the shopping terminal, for generating a virtual display of the tenant, as if he or she is wearing a selected design, color, pattern, shape and size of the apparel, footwear, Jewelry or accessory and a combination thereof, for the tenant's reviewing his selection.

Yet another object of present invention is to generate by the shopping terminal along with an associated one or more cameras a virtual, real time continuous motion display of the tenant standing in front of the shopping terminal monitor, enabling the tenant to repeatedly change his or her apparel, footwear, jewelry and accessories, by updating of the display with the tenant's re-selection of colors, sizes, designs, shapes and patterns, displaying the tenant as if he or she is re-dressed in his selected items in front of a mirror of a virtual apparel, footwear, jewelry or accessories store.

A further object of the present invention is to provide the shopping terminal with a printer, or printer output driver, to enable the printing of the virtual image display as selected, or print a selected e-commerce newspapers, magazines and other publications, and/or print a processed order, a transaction confirmation and a billing or invoice copy for the ordered services and/or merchandise. The printer can be any standard well known Color or B/W printer as used with PCs, or it can be specifically designed and manufactured to be mounted as part of the shopping terminal or on the walls along side the shopping terminal inside the apartment, house or office.

The associated one or more cameras can be a digital or analog type cameras, which are attached to, or are embedded into the shopping terminal, or placed or mounted in the vicinity of the shopping terminal for generating a virtual mirror through the monitor screen of the shopping terminal. The virtual mirror can be two-dimensional or three-dimensional and can be oriented to generate a left-right reversed view, known as a mirrored picture, or a straightforward view.

The method of the preferred embodiment of the present invention further provides for updating the programs, such as e-services and the e-merchandizing programs, CAD programs, the menus, the prices, delivery particulars, credit facilities or limits, billing methods and other particulars of the e-concierge services to all, a group or anyone of the tenants connected to the e-concierge by downloading updated programs periodically, or randomly through the network and/or the internet into the shopping terminals, the interface units or PCs of the building's video interphone systems.

Still another object of the present invention is to provide the shopping terminals with wired inputs and/or wireless receivers such as IR and RF receivers for enabling elderly tenants and/or bedridden tenants and/or diseased tenants to call for emergency services such as elderly care, nursing care, medical doctors and ambulance by activating IR or RF remote control devices attached to the tenants such as pendants or bracelets, and/or using remote emergency pull cord or push switches for activating the emergency service recall via the wired inputs of the shopping terminal.

An apparatus of yet another preferred embodiment comprises an interactive television interface unit for connecting a television cable network or an interactive television antenna system, used for distributing interactive television signals to a building or a house, with an e-concierge station via public or dedicated network and/or the internet. The television or the interactive television interface unit includes an RF receiver for a given RF frequency and a given bandwidth, or plurality of RF frequencies and/or varying bandwidths for selectively receiving given channels, and an RF modulator for injecting data signals and a converter/processor circuit for converting and interfacing television and interactive television signals including information signals and data with the e-concierge information signals, programs and data, thereby providing the tenants with access to an e-concierge station through their television or interactive television sets.

The television or the interactive television interface unit may further include circuits for generating real time television signals, for propagating and distributing the e-sales and e-service programs through the building's cable network or the building's antenna system to all the tenants of the building.

Further, the interactive television interface and/or an interactive television set may include a memory for storing a data comprising the services and the e-merchandizing programs including the e-services and e-merchandise menus, prices for the services and merchandise, orders processing, price calculations and billing. The storing of the data of the e-service and e-merchandizing program into the memory of an interactive television set or the interactive television interface transforms the interactive television system of a building or a house into a self contained e-concierge station, enabling the recalling and displaying of the menus and services onto the television sets without delay and for instant processing of the orders, the instant billing of the order and for completing the transaction between the interactive television sets and the interactive television interface, thereby, enabling for the final transaction to be carried automatically to the e-concierge, and/or the e-service and/or the e-merchandise provider at an earliest queuing time, within the network timing capacity and limitations.

Yet, another object of the present invention is to store into the interactive television interface with video programs and with CAD (computer aided design) program for generating sales programs and for processing a selection of items such as apparel, apparel sizes, colors, patterns, designs and shapes and for generating and outputting a display combining the selected items, such as the apparel along with footwear, jewelry or accessories, selected from a variety of pre-programmed or self configured sizes, colors, patterns, designs and shapes through the interactive television set.

The interactive television interface with its video programs and its CAD program can be further used for fitting such items as furniture, lamps, curtains, rugs, ornaments, home accessories and similar décor items for use inside the house, by generating a virtual interior display, on the basis of the e-merchandizing and e-service selection programs combined with one or more pictures of the interior of the home taken by one or more cameras associated with the interactive television set, the interactive television cable or antenna and/or the interactive television interface and the CAD program for providing the tenant with a CAD designed interior display along with his décor selection. This enables the tenant to place into or move around the selected items within the virtual display, for his further reviewing of the fitness of his or her selection.

Similarly, the fitting of selected items such as apparel, footwear, jewelry and accessories is processed by using the CAD to introduce onto one or more pictures, such as for example of tenant body, tenant's legs or tenant's general appearance, taken by one or more digital cameras associated with the television set, the television cable or the interactive television interface, for generating a virtual display of the tenant, as if he or she is wearing a selected design, color, pattern, shape and size of the apparel, footwear, jewelry or accessory and/or a combination thereof, for the tenant's reviewing of his or her selection.

Another object of present invention is to generate by the interactive television set along with an associated one or more cameras a virtual, real time continuous motion display of the tenant standing in front of the shopping terminal monitor, enabling the tenant to repeatedly change his or her apparel, footwear, jewelry and accessories, by updating of the display with the tenant's re-selection of colors, sizes, designs, shapes and patterns, displaying the tenant as if he or she is re-dressed in his or her selected items in front of a mirror of a virtual apparel, footwear, jewelry or accessories store.

A further object of the present invention is to provide the interactive television with a printer, or printer output driver, to enable the printing of the virtual image display as selected, or print a selected e-commerce newspapers, magazines and other publications, and/or print a processed order, a transaction confirmation and a billing or invoice copy for the ordered services and/or merchandise. The printer can be any standard well known Color or B/W printer as used with PCs, or it can be specifically designed and manufactured to be mounted as part of the interactive television set or on walls along side the interactive television set inside the apartment, house or office.

The stored e-services and e-merchandise programs may include stored music, movies, games and/or other software and the interactive television sets of the present invention therefore may be provided with downloading terminal output for a downloading music, movies, games or other software into PC or other software receiving apparatuses, such as Digital video recorders for movies, the well known I.Pod for music and Game boxes for games.

The associated one or more cameras can be of a digital or analog type cameras, which are attached to, or are embedded into the interactive television set, or placed or mounted in the vicinity of the interactive television set for generating a virtual mirror through the screen of the interactive television set. The virtual mirror can be two-dimensional or three-dimensional and can be oriented to generate left-right reversed view, known as a mirrored picture, or a straightforward view.

The method of the present invention further provides for updating programs, such as the e-services and the e-merchandizing programs, CAD programs, menus, prices, delivery particulars, credit facilities or limits, billing methods and other particulars of the e-concierge services to all, a group or anyone of the tenants connected to the e-concierge by downloading updated programs periodically, or randomly through the network and/or the internet into the interactive television sets, and/or the interactive television interface units. It becomes clear that the interactive television sets according to the present invention can be converted into shopping terminals to be used by tenants of a building for their e-services and e-merchandizing, similar to the shopping terminals of the video interphone system described above.

The advantages of the present method and apparatus of the present invention will become obvious, particularly for the following reasons:

the tenants can process their orders instantly with no waiting time and no queuing. The tenants are located at fixed addresses, each identified by their individual identification code. The tenants are attached to a fixed, installed wired system within a building or a house, connected in a closed circuit network with the e-concierge station and, for that reason, tenant's communication can be positively verified, thereby preventing errors and fraud.

Furthermore, the services and the merchandise that are supplied by the e-concierge and/or the service and merchandise providers are delivered to the tenants at their addresses, closing the order, the verification and the delivery circle promptly. Therefore, a very efficient supply chain can be setup within local areas for local deliveries, in accordance with the tenants' needs, thereby becoming the most efficient e-service and e-sales organization to suit every community in its location around the world.

BRIEF DESCRIPTION OF THE DRAWINGS

The foregoing objects and features of the present invention will become apparent from the following description of the preferred embodiment of the invention with reference to the accompanying drawings, in which:

FIG. 13 is an illustration of a television interphone monitor or a shopping terminal of the preferred embodiment with a touch screen operation.

DETAILED DESCRIPTION OF THE PREFERRED EMBODIMENTS

Figure 1:
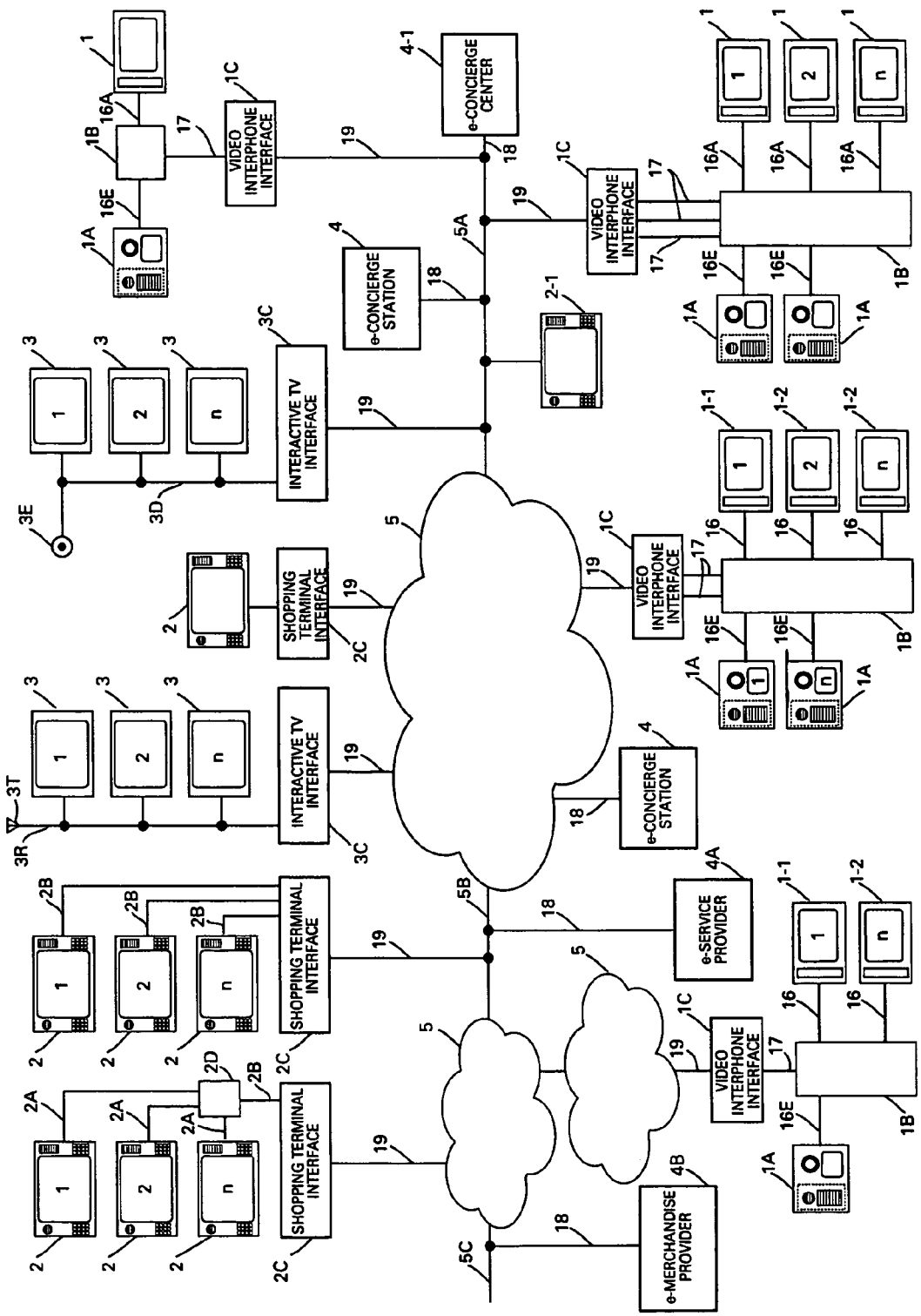
FIG. 1 is a block diagram of the e-concierge network for communicating with shopping terminals, video interphones and interactive television receivers.

FIG. 1 shows an apparatus for connecting e-concierge stations 4 with television interphone monitors 1, 1-1 and 1-2 shopping terminals 2, 2-1 and television or interactive television 3 through communication networks 5A, 5B and 5C and the internet 5.

The communication networks 5, 5A, 5B and 5C shown in FIG. 1 can be networks comprising copper wires, coax cables or fiber optic lines, or they can be wireless, such as terrestrial or satellite communication networks. The network can further comprise private network, a dedicated network, a public network and the internet and any combination thereof.

The television interphone monitors 1 are connected to a matrix selector 1B, which may incorporate analog or digital selectors and/or a hub, for connecting or routing the communication signals of any of the television interphone monitors 1 with any of the entry panels 1A or with a video interphone interface 1C. The video interphone interface 1C interfaces the communication signals of the video interphones, consisting of video, audio data, alarm and control signals and transforms the signals to interfaced data signals compatible with the signals processed by the e-concierge stations and injects the interfaced data signals to the communication network 5A, 5B and 5C or to the internet 5. Similarly, the video interphone interface 1C extracts and interfaces the e-concierge data signals including video, audio, data, alarm and control signals processed by the e-concierge station and transforms them into information signals compatible with the information signals processed by the television interphone systems, for propagating the interfaced signals to any of the television interphone monitors 1, 1-1 and 1-2, the entry panels 1A and to any local guard or concierge stations (not shown) of a building, thereby enabling the tenants to communicate through their television interphone monitors 1, 1-1 and 1-2 freely with an e-concierge station 4, e-service provider 4A and e-merchandise provider 4B.

Similarly, a shopping terminal interface 2C connects and interfaces the shopping terminals 2 with the e-concierge station 4, e-service provider and e-merchandise provider 4B through the communication network 5A, 5B and 5C or through the Internet 5. The shopping terminal interface 2C may be connected to the shopping terminals 2 via a local network hub 2D or it may comprise analog or digital selectors and/or a hub for connecting and/or routing any of the shopping terminals 2 of a building with the e-concierge station 4. The shopping terminal 2 may include a circuit for extracting, injecting and interfacing shopping communication signals similar to the circuits of the shopping terminal interface 2C, the shopping terminal 2-1 may be connected directly to a network such as to the network 5A shown in FIG. 1.

The television or the interactive televisions 3 are connected via antenna 3T and antenna distribution network 3R or via cable television 3E and its network 3D to an interactive television interface 3C. As will be explained later, the television or the interactive televisions 3 incorporate a shopping circuit for communicating with the e-concierge station 4, the e-service provider 4A and the e-merchandise provider 4B via the interactive television interface 3C and through the network 5A, 5B and 5C or via the internet 5 and a combination thereof.

The internal information communication lines of the buildings may include copper wires, coax cables or fiber optic lines and a combination thereof for propagating analog, digital and RF signals individually or in a multiplexed combination thereof, between the television interphone monitors; shopping terminals 2 and televisions 3 and the respective interfaces 1C, 2C and 3C.

Figure 2:
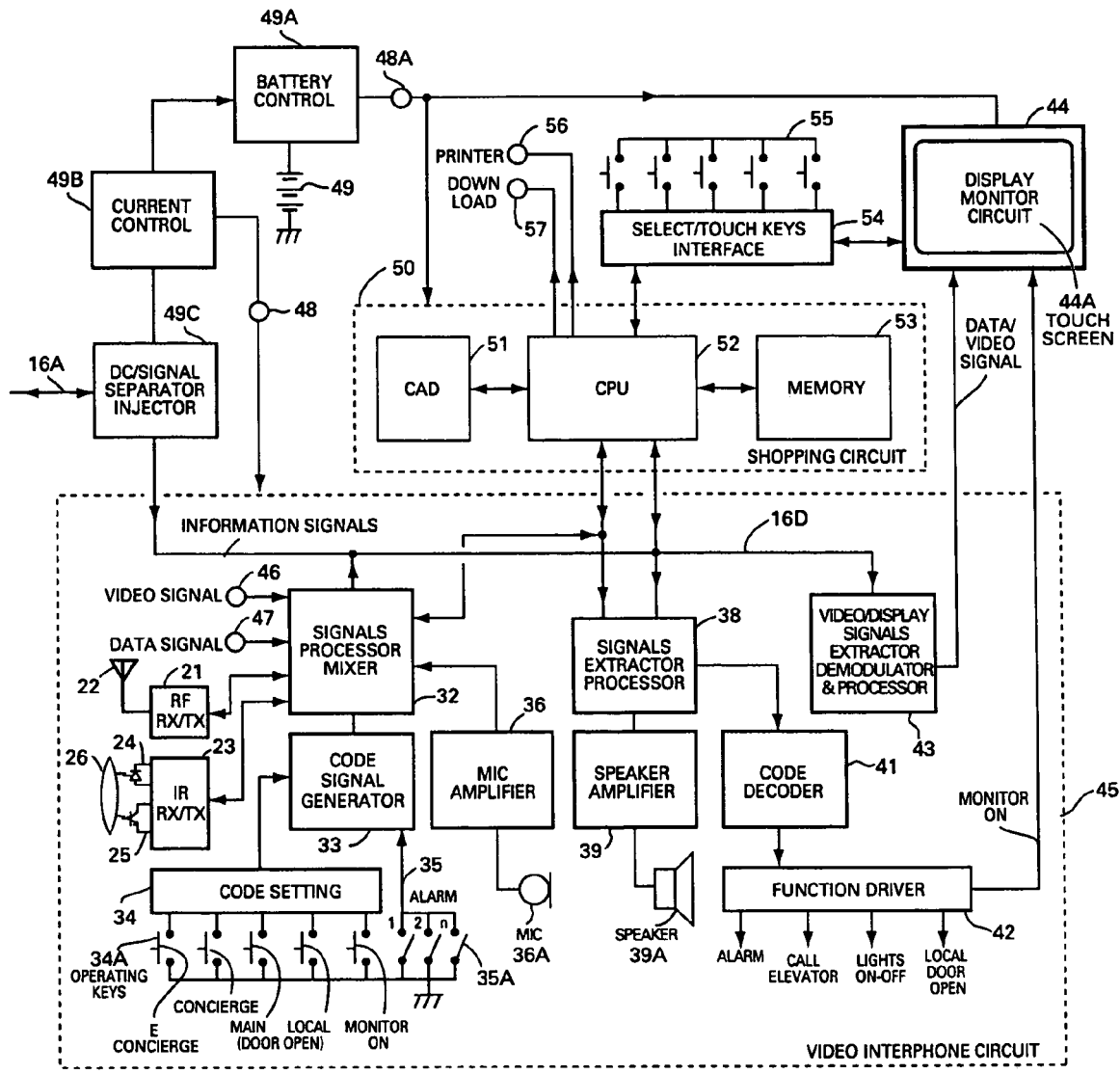
FIG. 2 is a block diagram of an electrical circuit of a television interphone monitor, incorporating a shopping circuit according to the present invention.

FIG. 2 shows an electrical circuit of the television interphone monitor diagrammatically which incorporates a shipping circuit. An information transmission line 16A of FIG. 2 provides two way communications, comprising audio, video, alarm, control and data signals, and feeds regulated DC current for operating the television interphone monitor 1, which is connected to information transmission line 16A through a DC-signal injector/separator circuit 49C for separating the DC power from the information signals. The separator circuit 49C may consist of a coupling capacitor for coupling the signals and blocking the DC current supply from the signal processing circuits and RF filters for removing the signals from the DC line. It may also consist of signal transformers or optical couplers for retrieving information signals from the DC and RF traps for removing the information signals from the DC line. The filtered DC line is fed from the injector/separator circuit 49C to a current control circuit 49B.

The current control circuit 49B ensures that the interphone circuits 45 are fed with a regulated current through a terminal 48, and a trickle current for charging a Ni—Cd or other rechargeable battery 49 through a battery control circuit 49A. The battery control circuit further employs a switch-on circuit for connecting the battery to the television monitor circuit through a terminal 48A for operating the monitor and a shopping circuit 50 and a switch over circuit for providing backup power for operating the television interphone monitor 1 during power the cut off.

The details of the regulated current supply and the use of the rechargeable battery are fully described in the U.S. Pat. No. 5,923,363, the entire content of which is incorporated herein by reference.

Figure 3:
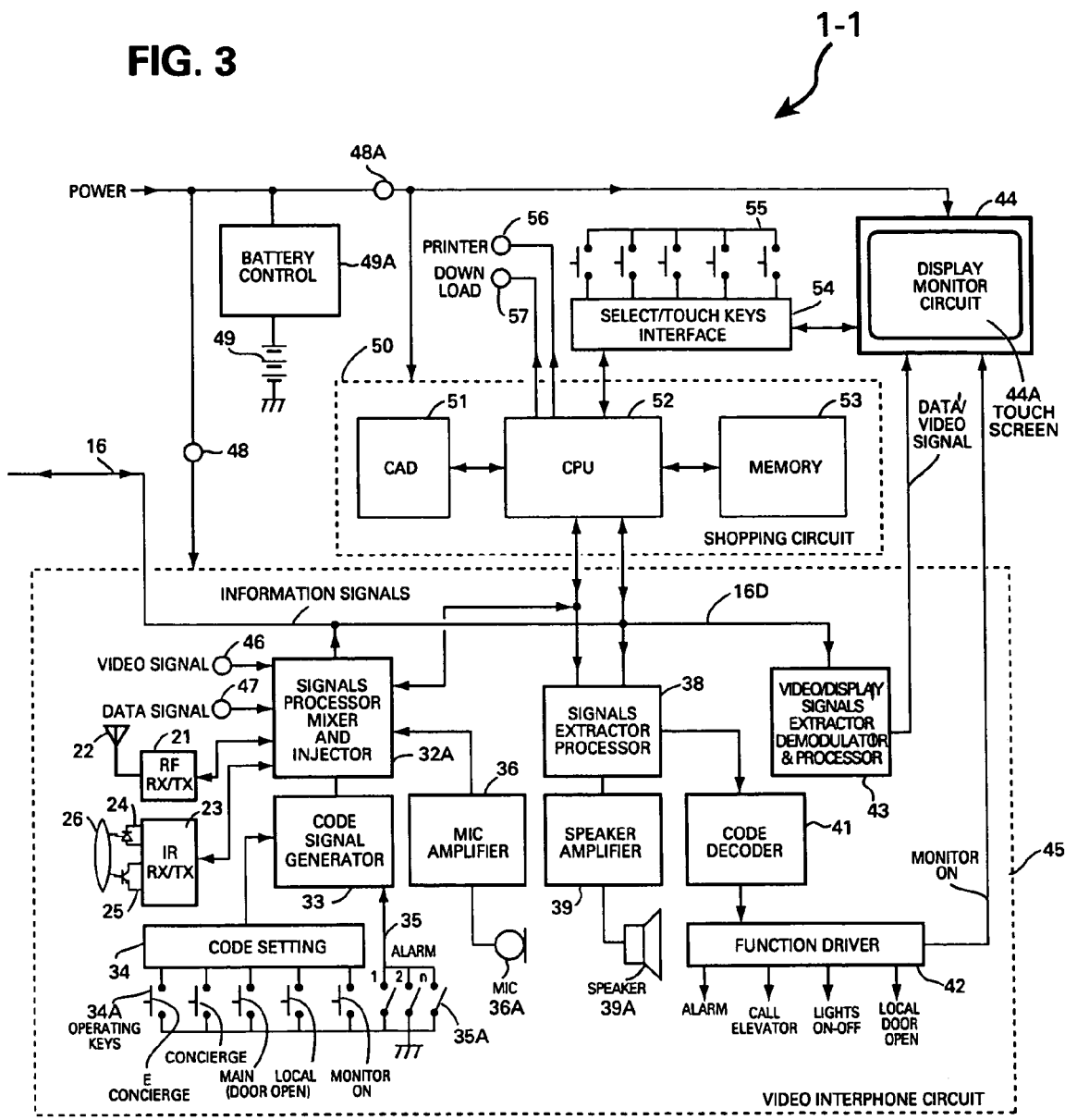
FIG. 3 is a block diagram of a television interphone monitor shown in FIG. 2 wherein the television interphone monitor is powered via the information transmission line.

The television interphone monitor shown in 1-1 of FIG. 3 is powered by a DC power that directly feeds the terminals 48, 48A of FIG. 2 and the battery control circuit 49A for charging the battery 49. The battery control circuit 49A includes a switch over circuit for switching on the battery to provide a battery backup power to the circuit of the television interphone monitor 1-1 in the event of power loss or power cut. Since the television interphone monitor 1-1 is not powered by a regulated current through the transmission line 16A shown in FIG. 2, the current control circuit 49B and the DC/signal separator/injector 49C are not used.

For injecting information signals into the transmission line 16 the television interphone monitor 1-1 employs a signal processor mixer and injector circuit 32A. The television interphone monitor 1-2 of FIG. 4 also employs the circuit 32A for injecting the information signals into the transmission line 16.

Figure 4:
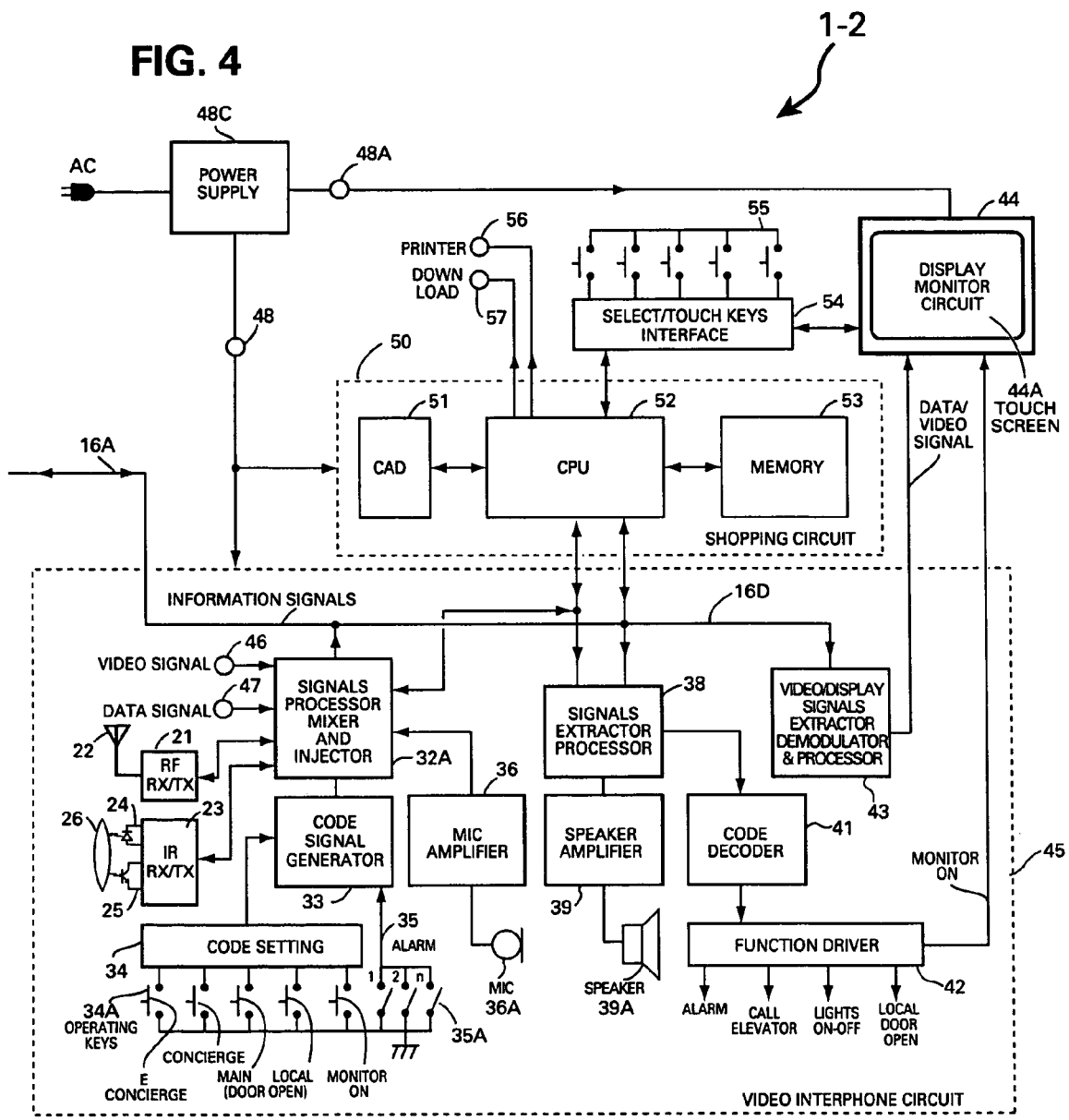
FIG. 4 is a block diagram of the television interphone monitor shown in FIG. 2 wherein the television interphone monitor is powered by the AC power source.

The television interphone monitor 1-2 of FIG. 4 is powered by an AC power source through a power regulator circuit 48C that directly feeds the terminals 48 and 48A of FIG. 4. No rechargeable battery is shown in the television interphone monitor 1-2 but if a backup rechargeable battery is needed a circuit for charging and controlling the battery such as circuit 49A of FIG. 3 can be incorporated in the television interphone monitor 1-2 shown in FIG. 4.

Outside the powering methods and the injection point of the information signal into the transmission lines 16 and 16A, the television interphone monitors 1, 1-1 and 1-2 of the preferred embodiment employ similar circuits throughout.

The video interphone circuit 45 of the television interphone monitors 1, 1-1 and 1-2 shown in FIGS. 2-4 includes a code setting circuit 34 for setting control and command codes through the operating keys 34A such as keys for generating a code for opening the door lock or for generating a code for calling the elevator into a given floor or switching the lights on-off and/or for generating a code for recalling the e-concierge station. An alarm input line 35 and alarm contacts 35A of the interphone circuit 45 will cause code generating circuit 33 to generate an alarm code when activated manually or automatically through a peripheral alarm equipment such as a burglar or fire alarm.

The interphone circuit 45 shown also includes a wireless transceiver 21 and/or IR transceiver 23 for remotely receiving and generating coded alarms, commands, control and data signals, commensurating with the codes of the code signal generator 33 which generates alarm, command and control code signals.

The generated code signals of the wireless transceiver 21, the IR transceiver 23 and the code signal generator 33 may employ well known dial-tone frequencies, or FSK (frequency shift keying) or such well known RS422 or RS232 serial signals or IP coded signals, for feeding the coded signals to the signal processor/mixer 32 or 32A for mixing the coded control signals with the audio signal generated by a microphone 36A and fed through mic amplifier 36 and/or with video signals fed through a terminal 46 and/or with data signal fed through a terminal 47 and for injecting the mixed signals into the transmission line 16 of FIG. 3 and FIG. 4 directly through the an injector portion of the circuit 32A, or to the transmission line 16A of FIG. 2 via a DC-signal injector/separator circuit 49C.

The interphone circuit 45 also includes a signal extractor processor 38, connected to the transmission line 16 or 16A via the line portion 16D for extracting the information signals from the transmission lines 16 or 16A and feeding the extracted signal to a speaker amplifier 39 coupled to a speaker 39A for providing voice communication, and to a code decoder 41 for decoding the extracted code signals, coupled to a function driver 42 for operating the system, and a video signal extractor demodulator 43 for demodulating or decompressing or decoding the video signals and for generating video display onto the display monitor 44.

As the signal processor/mixer 32A or 32 injects the coded signals directly to the transmission line 16 or via the DC-signal injector/separator circuit 49C to the transmission line 16A and as the code extractor processor 38 extracts the coded signals from the transmission line 16 or 16A and feeds the extracted codes to the function driver 42 through the code decoder 41, it become obvious that the interphone circuit 45 provides full duplex or two way communication capabilities through the transmission line 16 or 16A.

The duplex capabilities include the received wireless or IR coded control and command signals that are mixed and injected into the transmission line 16 or 16A, which can be extracted by the signal extractor processor 38 and decoded by the code decoder 41 for operating the function driver 42, the display monitor and the select/touch keys interface 54, thus enabling the use of a wireless or IR remote control device for remotely operating the television interphone monitor, and as will be explained later, the shopping circuit 50.

The entrance panels 1A of FIG. 1 include a code setting and generating circuit, not shown, for setting control codes and generating control signals similar to the codes generated by the code setting circuit 34 and code signal generating circuit 33 of FIG. 2, generating codes such as for activating a ringer, or opening the door lock or calling the elevator into a given floor or switching the corridors lights on-off. The entrance panel further includes address keys for addressing a television interphone monitor of a given apartment or for engaging a local guard, local concierge or the e-concierge station, as well as alarm and control circuit, which can be activated manually or automatically through peripheral such as wireless door key, magnetic card key, access control equipment and burglar or fire alarm equipment.

The code signal setting and generating and mixing circuit of the entrance panel may employ well known dial-tone frequencies, shift frequency keying or serial signals such as RS422 or RS232 or an IP based signals such as are used for TCP/IP, Ethernet or ATM network, similar to the signals generated by the television interphone monitors 1, 1-1 and 1-2. The coded control, command and alarm signals mixed with data, audio and video signals are injected into the transmission line 16E connecting the entrance panel with the matrix selector 1B, thereby, providing full two way information signal propagation through the matrix selector 1B between any of the television interphone monitors 1, 1-1 or 1-2 with any of the entrance panels 1A and the video interphone interface 1C through the transmission lines 17 shown in FIG. 1.

The television interphone monitors 1, 1-1 or 1-2, the entrance panel 1A, the matrix 1B and its connection to a network are explained only briefly above, as the full explanation of the television interphone monitor system is described in the U.S. Pat. No. 6,603,842 the entire content of which is herein by reference.

Figure 8:
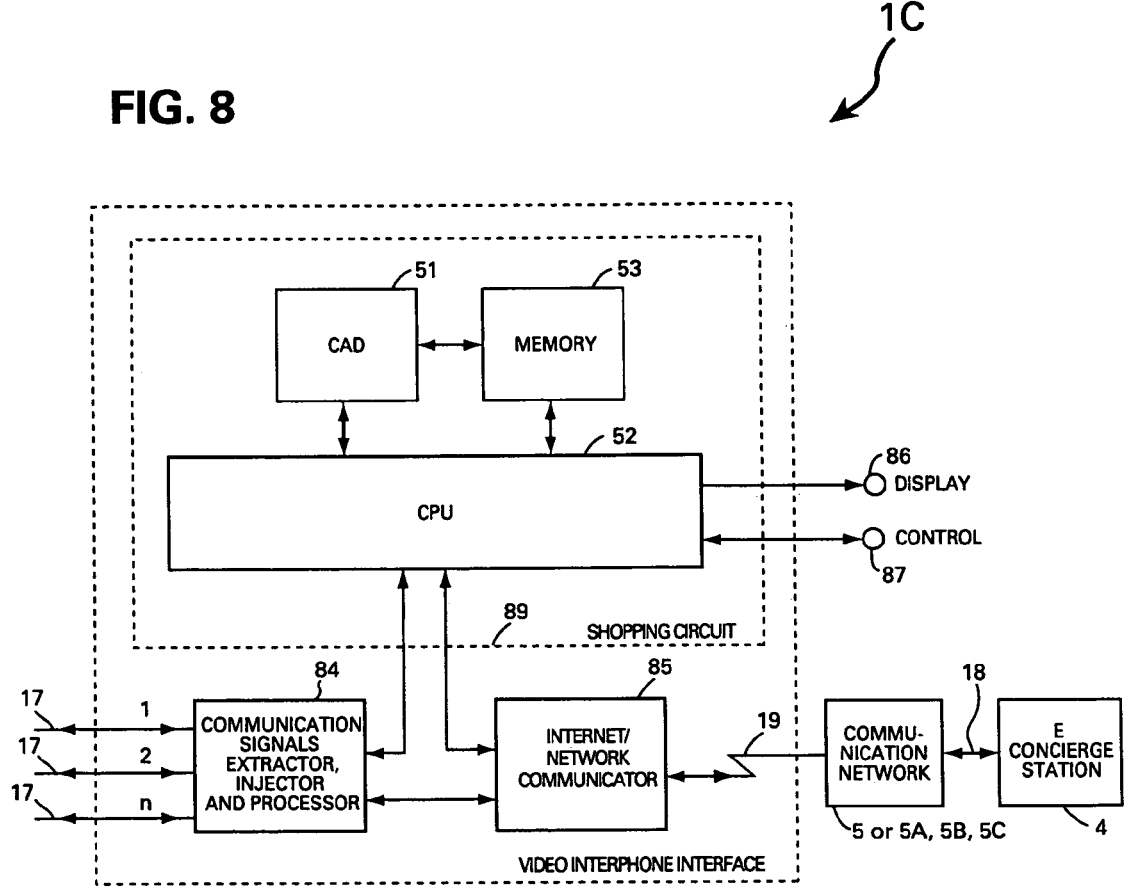
FIG. 8 is a block diagram of the electrical circuit of an interface unit for interfacing a video interphone system with an e-concierge station.

The video interphone interface 1C of FIG. 1 and FIG. 8 comprises signal and code converting circuits for propagating interfaced shopping signals between the television interphone system and the e-concierge station 4, the e-service provider 4A and the e-merchandise provider 4B. The interface 1C shown in detail in FIG. 8 includes a signal processing circuit 84 for receiving information signals propagated through the transmission lines 17 for feeding the information signals to a CPU 52. The CPU 52 reprocesses and converts the shopping information signals into an interfaced shopping signal for propagation via the networks 5A, 5B and 5C and the internet 5. The interfacing process may include the conversion of an analog or digital audio signals into compressed audio or into voice over IP data, similarly the CPU may convert analog, differential or digital video signals into compressed video signals, using any of the well known compressions such as the different JPEG, MPEG variations or other compression standard. The CPU 52 may further convert the commands, controls, alarm and data signals into new data formats such as serial or IP based protocol. The CPU 52 of FIG. 8 further combines the converted signals to form an interfaced data signal and feeds the interfaced data signal to the internet/network communicator circuit 85.

An internet/network communicator 85 of the video interphone interface 1C feeds the interfaced shopping signal to the e-concierge station 4, e-service provider 4A and e-merchandise provider 4B via the internet 5 and the communication network 5A, 5B and/or 5C or a combination thereof. The e-concierge return shopping signals are fed through the internet 5 and the communication network 5A, 5B and/or 5C and through the internet/network communicator 85 to the CPU circuit 52. The returned shopping or data signals which are compatible with the interfaced shopping signal and fed to the CPU 52, are reprocessed and converted back into the information signals including audio, video, alarm, control and data signals processed by the video interphone system's units, such as the entrance panel 1A and the television interphone monitor 1, 1-1 and 1-2.

The reprocessed returned shopping signal are then fed into communication signal processor circuit 84 and through the transmission line 17 and the matrix selector 1B to an addressed entrance panel 1A or an addressed television interphone monitor 1, 1-1 or 1-2 and/or to an addressed local concierge and/or guard station (not shown) or to any combination thereof, thereby providing full comprehensive two way duplex shopping signal propagation between the e-concierge network and the video interphones network.

The information signal generated by the television interphone monitor 1, 1-1 and 1-2 of FIG. 2, FIG. 3 and FIG. 4 can be reprocessed and interfaced by the CPU 52 of the shopping circuit 50 of the video interphone monitors 1, 1-1 and 1-2, instead of being reprocessed and interfaced by the video interphone interface 1C. The CPU 52 of the shopping circuit 50 of the television interphone monitors 1, 1-1 and 1-2 and the CPU 52 of the video interphone interface 1C may be identical device and employ similar software programs for reprocessing the information signals. The CPU 52 of the shopping circuit 50 and 89 may use well known analog to digital converters that are commonly available in IC packages and/or use well known ICs for compressing the audio and/or the video signals, and for converting data signals. Alternatively the CPUs 52 of FIG. 2, FIG. 3, FIG. 4 AND FIG. 8 can employ well known software programs for compressing the audio and/or the video signals and for reprocessing and interfacing the alarm, command, control and data signals, as well as for combining the reprocessed signals into a stream of interfaced data signal, for propagation through networks and the internet.

The transmission lines 16, 16A and 17 connecting the television interphone monitors 1, 1-1 and 1-2, the entrance panels 1A and the video interphone interface 1C can propagate the interfaced data signals, the same way they propagate information signals comprising audio, video, alarm, control and data signals. Therefore, it is obvious that the video interphone system's internal transmission line network can be employed for propagating information signals for operating the video interphone system or for propagating interfaced shopping signals for operating the television interphone monitors 1, 1-1 and 1-2 as independent shopping terminals.

It will therefore become clear that the television interphone monitors 1, 1-1 and 1-2 can be used for shopping through the shopping circuit 89 of the video interphone interface 1C, or through the shopping circuit 50 of the television interphone monitors 1, 1-1 and 1-2. It is also clear that by using the shopping circuit 89 of the video interphone interface 1C, there will be a capacity limit as to the number of tenants the video interphone interface 1C can handle simultaneously, while the employment of individual shopping circuits 50 in every television interphone monitor 1, 1-1 and 1-2 offer no capacity limitation so that each and every tenant of a building is able to process his shopping for e-services and/or e-merchandise freely at any time and without queuing.

The communication signal processor 84 of FIG. 8 can detect and identify the signals processed through its circuits to feed the combined mixed information signals to CPU 52 for reprocessing and the identified interfaced shopping signals directly to the internet/network communicator circuit 85, thereby eliminating a reprocessing step by the CPU 52 of the video interphone interface 1C.

Further, the CPU 52 of the video interphone interface 1C of FIG. 8 contains in its memory 53 data pertaining each individual television interphone monitor 1, 1-1 and 1-2 of the system connected to it and therefore can command and direct the communication signal processor 84 and the internet/network communicator 85 to communicate directly two-way interfaced shopping signals with television interphone monitors containing the shopping circuit 50 and communicate interfaced shopping signals, or interface the two-way combined mixed signals of the video interphone system through the CPU circuits 52 for providing interfaced communication to the television interphone monitors without the shopping circuit 50, such as known television interphone monitors disclosed in U.S. Pat. No. 6,603,842.

The signal processor mixer and injector circuits 32 and 32A of the television interphone monitors 1, 1-1 and 1-2 can feed the whole mixed information signals, including audio, video, alarm, control, command and data signals, or selected processed signals such as only video and data, or audio and alarm, or control and alarm directly to the CPU 52 and to the signal extractor processor 38. By this, and the bypassing of the reprocessing of the interfaced shopping signals, the circuit operation becomes more efficient, whereby not all signal are routed to the CPU 52 for processing and not all signals need be injected or extracted, but only the needed signals for each process.

The CPU (central processing unit) 52 of the shopping circuits 89 of FIG. 8 and the CPU 52 of the shopping circuit 50 of FIG. 2, FIG. 3 and FIG. 4 include microprocessor such as the well known Pentium processor and a chip set used in the well known mother boards of Desk top, Portable or Pocket PCs, along with its operating software programs, such as the well known Linux or Windows or similar operating software.

The shopping circuits 50 and 89 further include a memory device 53 such as a well known HDD (hard disk drive) and a CAD circuit 51. The CAD (computer aided design) may comprise an independent well known microprocessor device or DSP (digital signal processor) device, or it may be a well known CAD software program that utilizes the operating software of the CPU 52 of the shopping circuits 50 and 89. The e-concierge program and the CAD program are loaded into the memory device 53 through the CPU 52 and the transmission line 16 or 16A, 17 and 19 respectively and are updated periodically or randomly.

The CAD design parameters program can be further updated and modified periodically or randomly for providing the CAD with a specific design programs to compliment and match the updating of the e-services and e-merchandise programs offered by the e-concierge.

The e-concierge program may consist of services such as security, alarm monitoring, ticketing for shows and concerts, delivery of cooked food, meals and groceries, medical services, emergency services, travel, hotel bookings, shopping of merchandise, bank transactions and more to the registered tenants. The program menus, price lists, order processing, billing, credit and payment programs are all fed and stored into the memory 53 of the shopping circuit 50 of the television interphone monitors, 1, 1-1 and 1-2 on the basis of the details of the registered individual tenant, and into the memory 53 of the shopping circuit 89 of the video interphone interface 1C on the basis of the details of the registered group of tenants of the given building, wherein all the tenants of the building are registered and coded for identification.

The coding of each individual registered tenant and in view of the television interphone monitor is connected to a hard wired system, offer added communication security by preventing fraud and unauthorized access into the communication network of the e-concierge station 4, the e-concierge center 4-1, the e-service provider 4A and the e-merchandise provider 4B.

Moreover, as the entire e-concierge network can be protected by encryption, well known fire walls and by enabling only registered e-service and e-merchandise providers to operate from registered addresses and to serve and sell only to registered tenants at their registered addresses, wherein the tenants are hard wired to a proprietary system and wherein the networks 5A, 5B and 5C and the internet network 5 are primarily used only for their communication propagation capabilities and not for their well known web network, the security level of the e-concierge network is substantially elevated.

With a secured and registered network environment the e-concierge can provide very efficient services, wherein for example, the tenants registered details are instantly recalled onto the display of on operator of an e-concierge station 4 or printed into a printout of an order for services and/or merchandise propagated to terminal the e-service provider 4A or the terminal of the e-merchandise provider 4B. The instant identification of the tenant and his/her address provides for the routing of the tenant call to the e-service 4A and e-merchandise 4B station closest to the tenant vicinity, for providing the fastest and most efficient services.

The instant ability to identify the tenant and its location, coupled with duplex communication between tenants and e-concierge station, including audio, command and control signals enable voice communications between an e-concierge station operator and a tenant and for the e-concierge station operator to operate the television video interphone 1, 1-1 and 1-2 or the video interphone interface 1C remotely, for recalling menus and processing the tenant's selection by following voice requests or commands of the tenant and generating data pertaining the tenant selection through the television interphone monitor 1, 1-1 or 1-2, or through the video interphone interface 1C and/or by transferring the tenant's order from the e-concierge station to the e-service provider and/or e-merchandise providers, including commands to process such items as orders, quantities, delivery confirmation, billing and payments, such as authorizing credit, or cash and the like.

Figure 11:
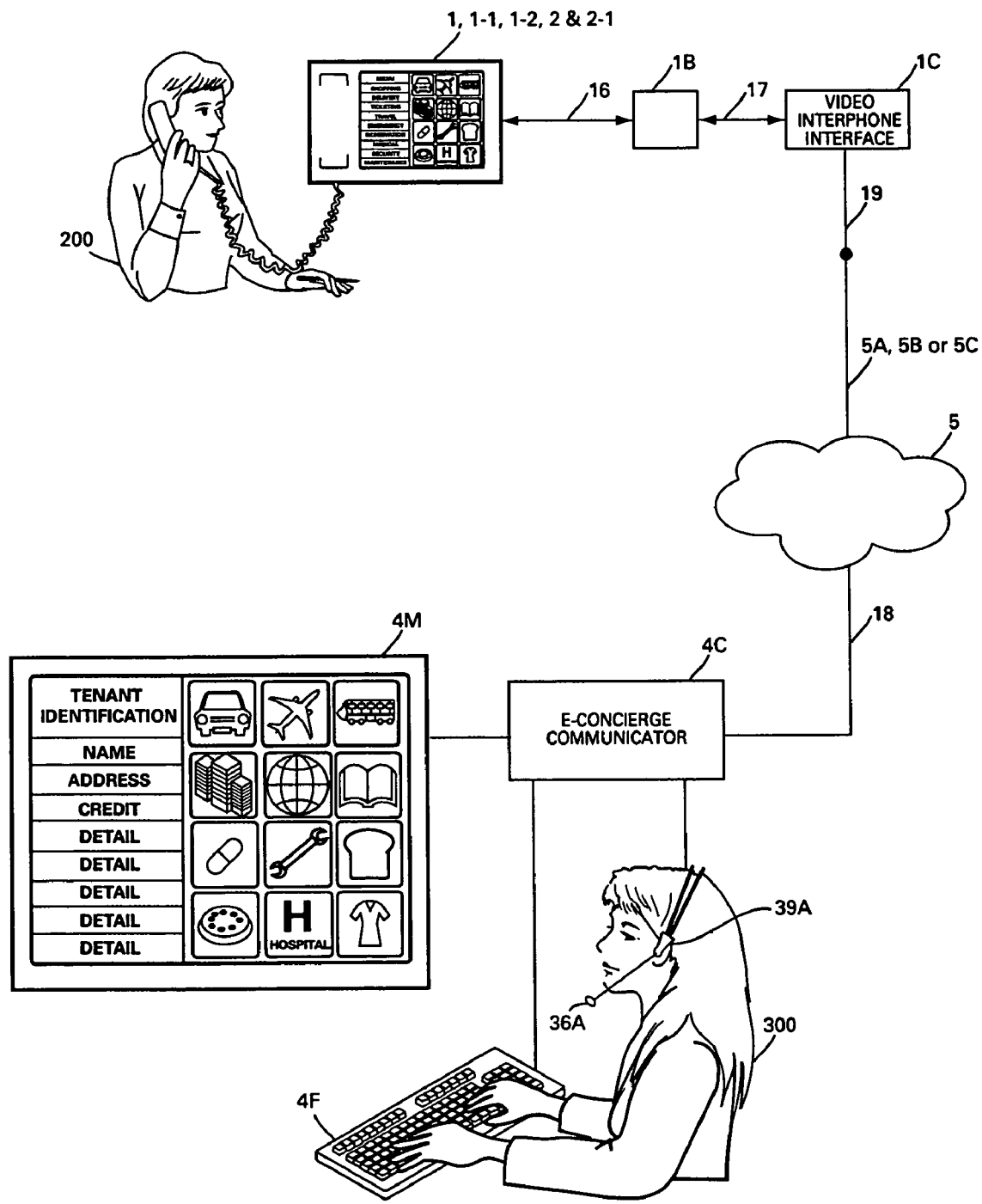
FIG. 11 is a block diagram and illustration of the preferred embodiment of an engaged e-concierge operator connected to a calling tenant.

As shown in FIG. 11 the tenant may for example, simply pick up the hand-set of his television interphone monitor 1, 1-1 or 1-2, touch an e-concierge call button to call and engage the e-concierge station and the engaged e-concierge station operator will identify instantly the calling tenant on his display. Once engaged the e-concierge operator is able to operate remotely the shopping circuits 50 or 89, on behalf of the tenant, by using the communicator 4C to transmit commands to the tenant's shopping circuit 50 such that if, for example the tenant asks for a pizza the operator simply touches a pizza icon via a touch screen of the e-concierge display 4M or click the pizza icon via a known mouse (not shown) or operate the e-concierge communicator 4C via a keyboard 4F to recall the pizza menus, prices, delivery details and the like, all of which are recalled simultaneously onto the communicator display 4M and onto the tenants monitor 44, wherein the recalled pizza menus is of a pizza provider that is located in the vicinity of the tenant address. Next for the tenant is to select a pizza, accept the delivery time, price and payment and, to confirm the transaction verbally, after reviewing an invoice generated by the CPU 52, on the basis of the program stored, after which the operator 300 transfers the order to the pizza provider 4B and set in motion the physical delivery of the pizza by the e-merchandise (pizza) provider 4B.

Once the e-concierge, the e-service and the e-merchandise programs and menus along with the operating and processing programs are installed in the memory 53 of the shopping circuits 50 and 89, it becomes clear that the capacity or the bandwidth of the networks 5A, 5B, 5C and the internet 5 do not influence the speed or the time it takes to recall programs, menus and/or process the orders to completion. For example, in the case of voice ordering it is only voice and control data that are being propagated, both of which require the limited bandwidth of 2~3 kilobytes. Therefore, the installation of the e-concierge programs into the shopping circuit 50 or 89 enables an instant access and recall, as well as instant remote activation and processing of orders by voice, or as described later, through a touch screen, remote control devices and the aid of a CAD by the tenant himself, providing cost saving by operating the system automatically without any assistance of an operator.

The e-concierge program can provide the tenants with a range of merchandise such as apparel, Jewelry, footwear, accessories, home furnishing, bed covers, carpets, curtains and similar merchandise that have to be selected and ordered on the basis of such items as material, color, shape, design, sizes and any other combination a variables. To provide the tenants with a good selection tool, the CAD program can be pre-designed such, that the tenant can take a measurement of himself and feed the data into the CAD program through a CAD setting menu, or the tenant can take measurement of himself using one or more video cameras 202 shown in FIG. 12 that are attached to the television interphone monitors 1, 1-1 or 1-2. The cameras 202 are adapted and calibrated to measure the sizes of an object at a given distance and to feed a data pertaining the size and shape of the tenant, or of a given portion of his body to the CAD 51 of the shopping circuit 50.

Figure 5:
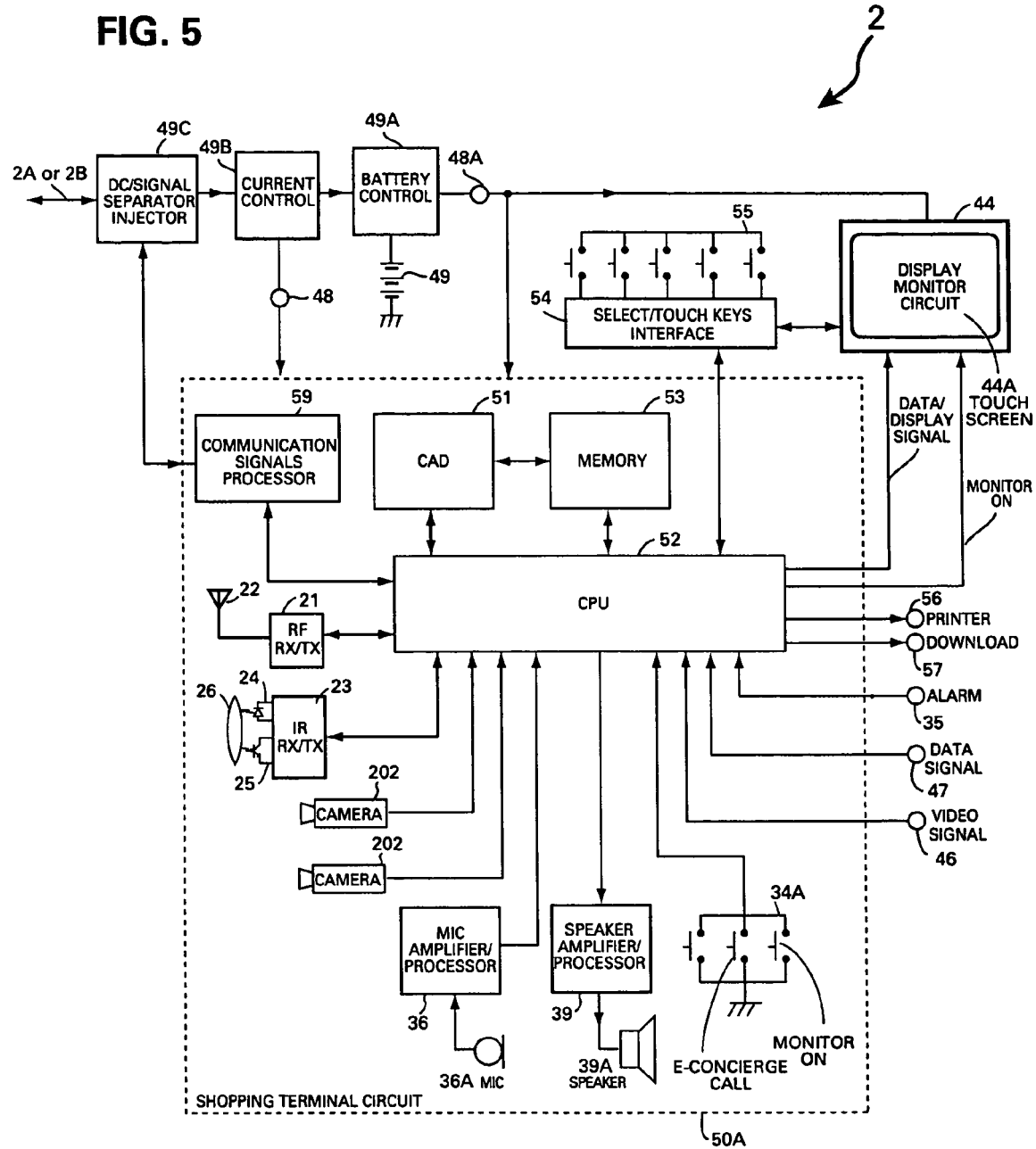
FIG. 5 is a block diagram of an electrical circuit of a shopping terminal of the present invention.
Figure 6:
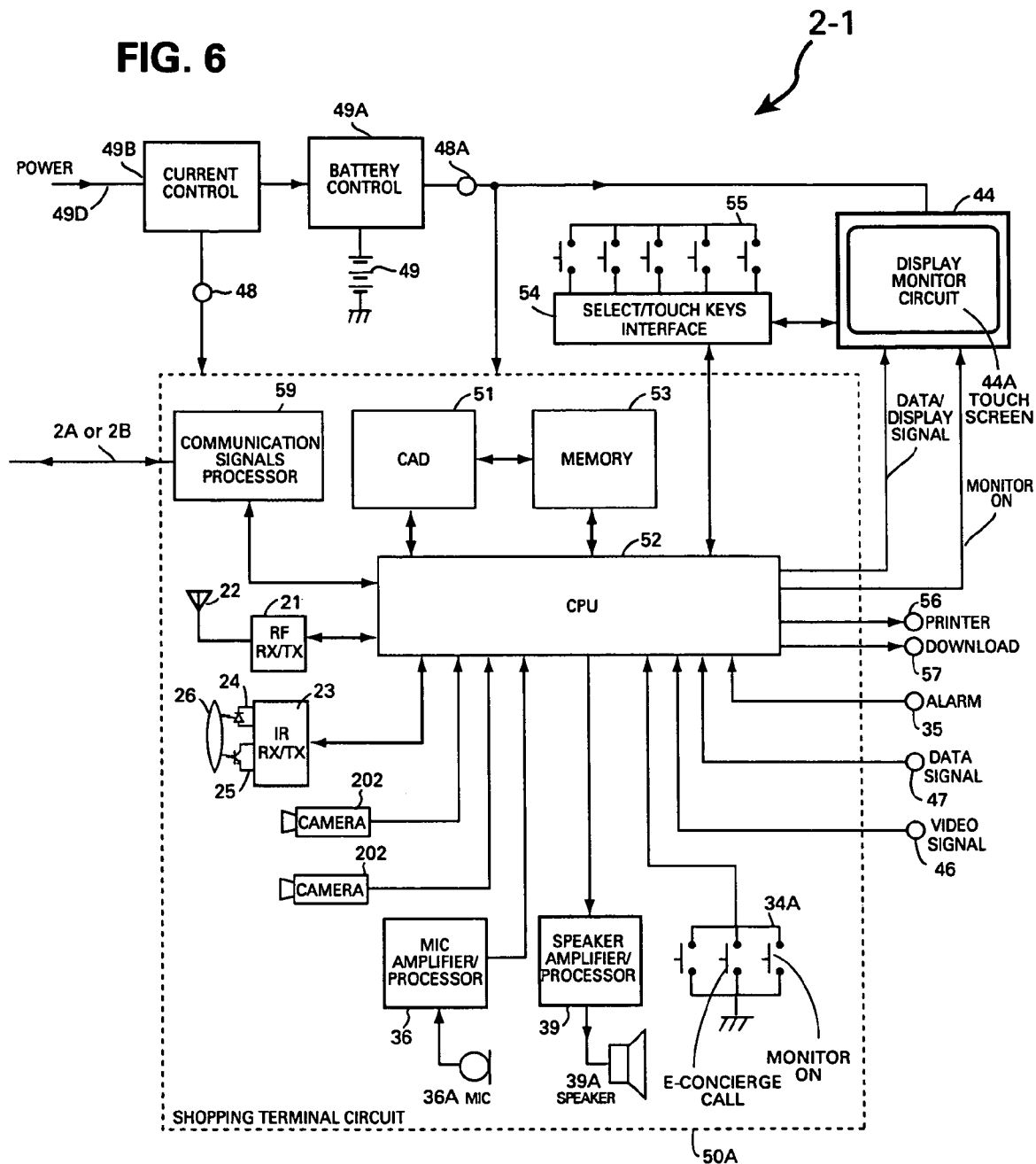
FIG. 6 is a block diagram of the shopping terminal shown in FIG. 5 powered via the information transmission lines.

The video or image signals along with the measurement data generated by the one or more video cameras 202 of the shopping terminal circuit as shown in FIGS. 5 and 6, are fed to the video terminal 46 and through the signal processor mixer into the CPU 52 and the CAD 51 of the television interphone monitors 1, 1-1 and 1-2 or to the CPU 52 and the CAD 51 of the video interphone interface C1.

Figure 12:
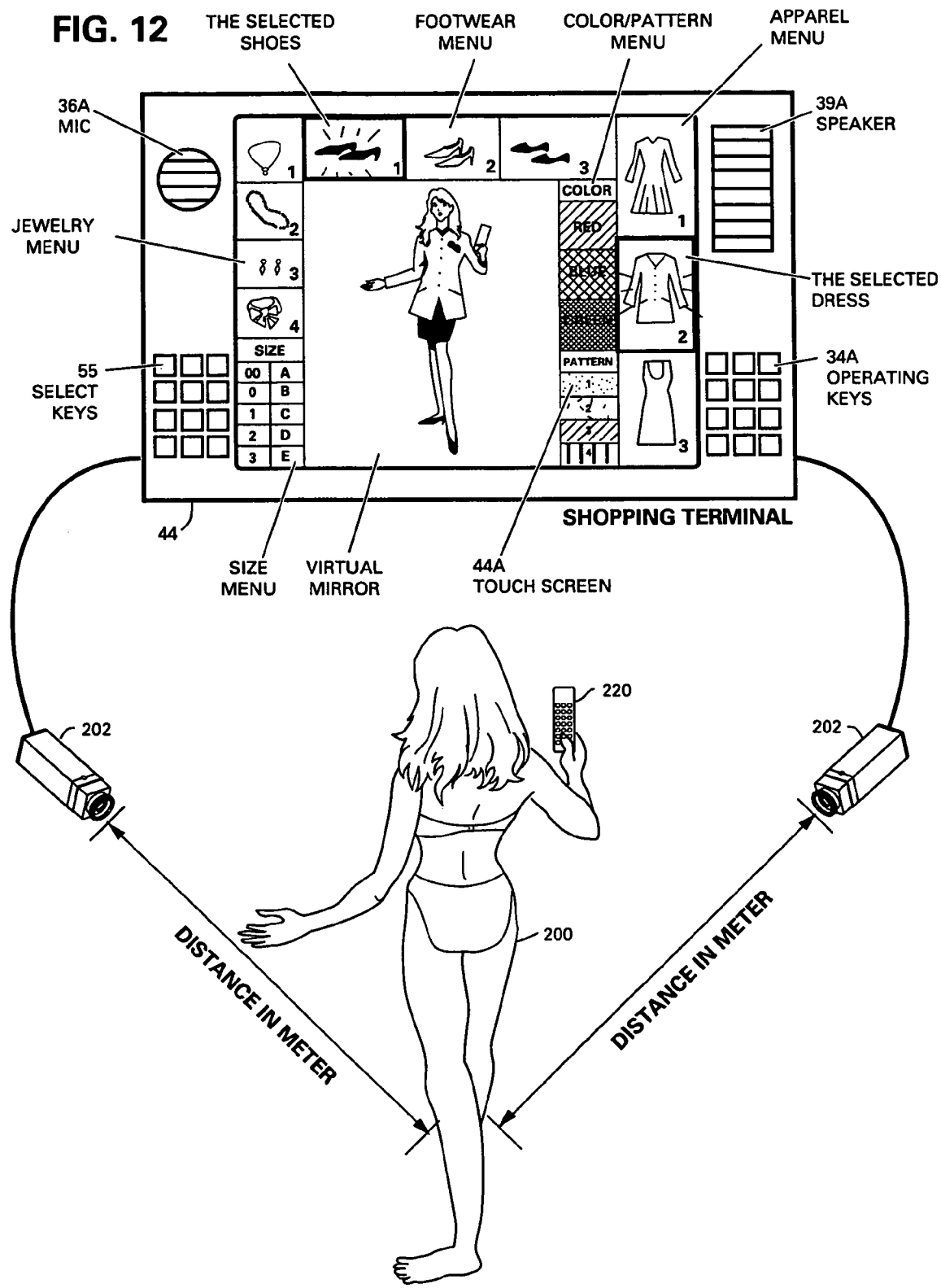
FIG. 12 is an illustration of a television interphone monitor or a shopping terminal of the preferred embodiment used as a virtual mirror for shopping of apparel, using a remote control device.

By using a large size monitor 44 of FIG. 2, FIG. 3 and FIG. 4 it is possible for the tenant to stand in front of the television interphone monitor, as if he is standing in front of a virtual mirror. As shown in FIG. 12, the tenant 200 is shown as if he or she were standing in front of a mirror and holding a wireless or IR remote control unit 220 in his/her hand for selecting such items as the material of the apparel, the design, the shape, the color, the size, and can virtually redress himself or herself by clicking the different icons of the menus, using the remote control unit 220 in front of the monitor 44.

Similarly, the CAD 51 program can be designed to dress up an image of a house interior or exterior, taken through the cameras 202 and wherein the tenant may drag and shift around inside the display of the house interior, those selected items of furniture, curtains, carpets or accessories offered by the e-concierge 4 and e-merchandise provider 4B. The tenant can therefore select such items as material, colors, shapes, design and sizes, similar to the selection of apparel as explained above.

Shown in FIG. 13 is a tenant in front of a television interphone monitor 1, 1-1 or 1-2, having a larger monitor screen 44, and wherein, the screen is provided with touch screen 44A and select keys 54. The shown television interphone monitor does not employ handset, but instead is provided with separate speaker 39A and microphone 36A and its microphone circuit 36 and speaker amplifier 39 include well known "hands free" voice communication, which is commonly used with telephone and interphone system for enabling the user to communicate without holding the handset in their hands. The television interphone monitor 1, 1-1 or 1-2 of FIG. 13 therefore can be operated by the tenant 200 through the touch screen 44A, touch keys 55 or a remote control 220 such as a well known wireless or IR remote control device, and process the shopping through the e-concierge 4 services, or directly to the e-service provider 4A and e-merchandise 4B provider, and complete the selection transaction, delivery confirmation, billing and payment instantly through the shopping circuit 50 or 89 without the involvement of an e-concierge station 4 operator.

The operating software program of the CPU 52 and the CAD 51 of the shopping circuit 50 may include a well known voice recognition program and voice activated commands and control for operating the shopping circuit of the television interphone monitors 1, 1-1 and 1-2 by the tenant's voice. Thereby, providing the most convenient way to recall menus and process an order for e-service and/or e-merchandise, as if the tenant is standing in front of a salesman of a shop counter.

The wireless transceiver 21 and the IR transceiver 23 (FIGS. 2-6) can be operated one way for receiving coded commands through the antenna 22 from a wireless remote control device 220 or through the IR receiving lens and filter 26 and photo transistor 25 from an IR remote control device 220 such as shown in FIG. 12. The wireless transceiver 21 and the IR transceiver 23 can be operated two way by using their respective transmitting devices, RF via the wireless antenna 22 and IR via the IR transmitting LED 24 and the IR lens 26. The two way transmission is needed during emergencies such as requesting medical assistance from an hospital, wherein the tenant can communicate with a medical doctor through a remote control device held by himself and provide the transmission of the tenant's picture along with transmitting data such as heart beat, blood pressure or voice communicate two way with the doctor. The IR remote control unit 220 can be changed to an IR or wireless remote control device, which an handicapped tenant must be wearing close to his body, such as pendant or a bracelet and the like, enabling the instant calling for help in case of emergencies.

Bed ridden tenants may be provided with a pull cord switch, or an emergency switch for calling medical emergencies, the pull cord switch or the emergency switch can be the alarm switch 35A, shown in FIG. 2, FIG. 3 and FIG. 4, connected directly to an alarm input 35 of the television interphone monitor 1, 1-1 and 1-2, or it can be an activating switch of an wireless remote control devices, such as the remote control 220 shown in FIG. 12 but with remote switch option, not shown.

The touch screen 44A (FIG. 12) and the select/touch keys interface 54 employ well known touch screen device and operating software program for selecting icons form a display screen such as LCD, PDM or CRT. The select keys 55 enables to select through keyboard or key array of standard items, such as recalling the interphone function, or switching over to alarm function, or to operate the shopping facilities without the need to switch on the monitor first.

The e-concierge program can further provide services such as downloading of movies, music, games or any software for which the television interphone monitors 1, 1-1 and 1-2 are provided with download terminal 57 for the well known downloading procedure, such as are used for downloading music to the well known ipod and similar devices.

The printer terminal 56 can be connected to a well known printer, or it can be permanently connected to a built-in printer, not shown, which may become an integral part of the television interphone monitor 1, 1-1 and 1-2. The printer output can be used for printing order confirmations, invoices, receipts and other details of transactions, such as insurance policies offered through the e-concierge 4 or airline tickets, or hotel bookings, or bank transaction processed directly with an e-service provider 4A, which may be a bank branch.

Further, the printer terminal 56 shown in FIGS. 2-4,5-7 and 9, 10 can be used for connecting well known printers such as ink jet printer or other known printers for printing upon command a service/shopping magazine or catalog for the services and merchandise offered by the e-concierge 4 and/or newspapers and magazines that are offered for sale through the e-concierge 4 and e-service 4A.

The cameras 202 shown in FIG. 12 can be analog or digital or network cameras, fitted with lens for measuring an object at a given distance such as 3 meter away from the lens, at which distance the camera feeds accurate X-Y (horizontal and vertical) oriented sizes. Alternatively, it is possible to employ two or more cameras 202, such as positioning the two or more cameras perpendicular to each other, for measuring X-Y-Z (horizontal, vertical and depth) sizes of an object, and for loading of the measured sizes into the CAD 51 program. The processing of the measurement of sizes and the loading of images taken by the cameras 202 can be preprogrammed into menus of the well known CAD and facilitated by using the wireless or IR remote control device 220 to simplify the process and record the measurements.

Since the cameras 202 may be used for providing a virtual mirror display, the cameras 202 may incorporate a well known left-right reverse circuit, or use a well known software program for reversing the display generated through output signals of the cameras 202, to thereby create a mirror image, which is a reversed image of the standard image generated by television cameras.

The e-concierge station shown in FIG. 11 includes an e-concierge communicator 4C, a display monitor 4M, a keyboard 4F and a headset including microphone 36A and speaker 39A that are similar to the microphone and speaker of the television interphone monitor. The e-concierge station may include other devices such as mouse, printers and other PC peripherals, not shown. The e-concierge communicator can be a well known PC, PC server or a proprietary computer based communicator for processing and communicating, audio, video, control, commands, alarm and data signals over the internet, or communicating interfaced data signals, compatible with the interfaced data signals generated by the video interphone interface 1C, or such interfaced signals that are compatible with well known LAN, WAN, ADSL, ATM or other known or proprietary network signals. The e-concierge communicator 4C can be installed with such well known Linux, Windows or other operating software or with a proprietary operating software and it includes well known microprocessor such as Pentium or other microprocessor and HDD or other memory device, similar to the microprocessors 52 and memory 53 of the shopping circuit 50 and 89.

The e-concierge programs installed into the memory of the e-concierge communicator include the tenants identifications and details of the tenants. Such that the memory of each e-concierge station 4 will be installed with the tenant's details data, pertaining the tenants in the area or location of a given e-concierge station 4 is covering, while the memory of the e-concierge center 4-1 shown in FIG. 1 will be installed with the entire registered data of tenants identifications and details.

The e-concierge communication display monitor 4M shown in FIG. 11 will automatically display the calling tenant identification, and the operator 300 can immediately voice communicate, via the microphone 36A and speaker 39A of the headset, with the tenant 200 that is holding the handset of the television interphone monitor 1, 1-1 or 1-2 in his or her hand.

The network connection shown in FIG. 11 may consist of transmission line 19, connecting the video interphone interface 1C with the network 5A, 5B and/or 5C and the internet 5, which is connected to transmission line 18 connecting the e-concierge communicator 4C. The network can be any combination or setup of the 5A, 5B, 5C networks and the internet 5.

Once engaged, the operator 300 can command through his or her keyboard 4F the display of the shopping circuit 50 or 89 of the calling tenant by propagating control commands through the network back to the video interphone interface 1C, for recalling any menu to be displayed on both monitors, the monitor 4M of the e-concierge station 4 and the monitor 44 of the television interphone monitor 1, 1-1 or 1-2, thereby, be in a position to follow up the requests of the tenant 200 and process the tenant order, while both, the operator 300 and the tenant 200 observe the same recalled e-service and e-merchandise menus and voice communicate via the handset of the television interphone monitor 1, 1-1 or 1-2 and the headset of the operator 300 as shown in FIG. 11.

During busy hours, the e-concierge operator can be a part timer operator, operating from his home using an e-concierge communicator 4C connected to the internet 5 and that is activated only during overload condition, thereby, substantially reducing the costs of maintaining standby operators, needed for an operator assisted e-concierge shopping during busy hours.

At times of very busy hours, when all the operators 300 are engaged and when the video interphone interface 1C is operating to its maximum capacity, the shopping circuit 50 of the television interphone monitor 1, 1-1 and 1-2 can process the order and complete the transaction, even though the transmission of the final order is delayed in an orderly process and requires no tenant personal involvement. As soon as a communication capacity becomes available the program can be designed to communicate the delayed transaction between the television interphone monitor 1, 1-1 or 1-2 and the video interphone interface 1C and propagated the delayed transaction details to the e-service 4A or the e-merchandise 4B.

The e-concierge center 4-1 shown in FIG. 1 also includes an e-concierge communicator such as the communicator 4C shown in FIG. 11. The communicator of the e-concierge center may include large capacity memory and large computing devices and will be installed with all data pertaining to all the tenants and to all the e-service providers 4A and e-merchandise providers 4B, along with all the e-concierge 4 programs.

The e-concierge center 4-1 will control or generate through its facilities all the updating and modifications of the e-concierge programs, such as changing the price, changing the services and changing the merchandise selection, add or delete tenants and change of payment terms and the like. The e-concierge center 4-1 will update the e-concierge stored programs periodically or randomly through the networks 5A, 5B, or 5C and the internet 5 or a combination thereof to all the e-concierge stations 4, the e-service 4A and e-merchandise 4B providers, preferably during low communication traffic time.

The e-concierge stations 4 will complete the update cycle and/or modify the e-concierge programs stored in the shopping circuits 50 and 89 of the television interphone monitors 1, 1-1 or 1-2 and the video interphone interface 1C, also via the network 5A, 5B, 5C and/or the internet 5, preferably during low communication traffic time, in order not to disrupt the e-concierge services in process.

Referring to FIG. 5 a shopping terminal 2 is shown, which is similar to the television interphone monitor 1 of FIG. 2, except that it is not connected to entry panels and therefore it is not used for communicating, viewing and/or recording visitors at the building entrances. Furthermore, the shopping terminal 2 does not employ a specific circuits such as the code signal generator 33 and the code setting circuit 34 used by the television interphone monitor 1 of FIG. 2, similarly the shopping terminal does not employ the signal processor mixer 32 or 32A, the signal extractor 38 and the video signal extractor demodulator and processor 43, all of which are used with the television interphone monitors 1, 1-1 and 1-2.

The shopping terminals 2 and 2-1 of FIG. 5 and FIG. 6 use the CPU 52 for processing microphone, speaker, data, control, command, alarm and video signals the same way a well known PC, microprocessor or DSP based apparatus processes audio, video, control, command, alarm and data signals, rendering the circuits 32, 32A, 33, 34, 38 and 43 of the television interphone monitors 1, 1-1 and 1-2 unnecessary.

Similarly, the shopping terminals 2 and 2-1 do not necessarily require the code decoder 41 or the function driver 42, because the shopping terminal primary use is not for operating such function as door opening, recalling elevators or switching on lights. For limited number of functions such as the switching on the display monitor, the I/O (input/output) of the CPU 52 can directly provide for, as shown in FIG. 5 AND FIG. 6.

The shopping terminals 2 and 2-1 of FIG. 5 and FIG. 6 are identical with the exception of their power supply, wherein the shopping terminal 2 of FIG. 5 is powered via the transmission line 2B, similar to the power fed to the television interphone monitor 1 of FIG. 2 via the transmission line 16A. The DC/signal separator injector 49C, the current control circuit 49B, the battery control circuit 49A and the rechargeable battery 49 operate the same way as the similar circuits of the television interphone monitor 1.

The shopping terminal 2-1 of FIG. 6 connects to a power source through the current control circuit 49B for feeding the shopping terminal circuit 50A with controlled current via terminal 48 for enabling a stand by operation, known as a sleep mode and to the battery control circuit 49A for charging the rechargeable battery 49. The battery control circuit 49A, similar to the circuit 49A of the television interphone monitor 1 employs switch-on circuit for switching-on the power to the display monitor and for waking up and operating the shopping terminal circuit 50A.

Since the shopping terminal 2-1 is not powered through the transmission line 2A it does not require the DC/signal separator injector 49C. Accordingly the communication signal processor circuit 59 is processing the two way combined processed audio, video, control, command, alarm and data signals between the shopping terminal 2-1 and the shopping terminal interface 2C, or as will be explained later, between the shopping terminal 2-1 and the network 5A, 5B, 5C or the internet 5. The communication signal processor 59 of the shopping terminal 2 of FIG. 5 however feeds and receives the combined processed audio, video, control, command, alarm and data signals through the DC/signal separator injector circuit 49C, which is similar to the circuit 49C of the television interphone monitor 1 of FIG. 2.

The power supply for the shopping terminal 2-1 of FIG. 6 can be an AC or DC power supply and the shopping terminal 2-1 can be powdered without the use of a rechargeable battery 49, similar to the power supply 48C of the television interphone monitor 1-2 of FIG. 4. Therefore the current control 49B, the battery control 49A along with the rechargeable battery 49 shown in FIG. 6 are not needed and will not be used.

Accordingly, the difference between the shopping terminals 2 an 2-1 outside the power arrangement, including variation in power supplies, will be the connection between the communication signal processor 59 and the transmission lines 2A or 2B, which is shown as directly connected in FIG. 6, or via DC/signal separator injector 49C as shown in FIG. 5, while the other shopping circuits of the shopping terminal 2 and 2-1 of the preferred embodiment are similar circuits throughout.

As explained, the primary functions of the shopping terminals 2 and 2-1 are similar to the functions of the shopping circuits 50 of the television interphone monitors 1, 1-1 and 1-2, whereby the tenant can call and engage the e-concierge station 4, the e-service 4A or e-merchandise 4B providers via a key, such as a single key 34A of FIG. 5 and FIG. 6 and voice communicate via the microphone 36A, the microphone amplifier/processor 36, the speaker amplifier/processor 39 and the speaker 39A. The tenant can view the instant displayed menus or price list, review the order, the invoice, the confirmation and the payment through the display monitor 44, the same way the shopping circuit 50 of the television interphone monitors 1, 1-1 and 1-2 provide. The e-concierge operator 300 at the other end can operate the shopping terminals 2 and 2-1 remotely on the basis of the tenant voice and requests, the same way it can remotely operate the shopping circuit 50 of the television interphone monitors 1, 1-1 and 1-2.

Further, the tenant can operate the CAD 51 via the wireless or IR remote control devices, through RF transceiver 21 or IR transceiver 23, employ the cameras 202, printout invoices, magazines or other publication through the printer connector 56, use the select keys 55, the touch screen 44A and/or activate the shopping terminal 2 or 2-1 through voice activated programs, which are installed for selecting services, merchandise or for operating the shopping terminal and the CAD via the tenant's voice commands. The tenant can further download music, movies, games or other software programs through the download connector 57, in the same way the tenant uses, operates and processes his shopping through the shopping circuit 50 of the television interphone monitors 1, 1-1 and 1-2.

The data connector 47, the video connector 46 and the alarm connector 35 enable the incorporation of peripheral equipment for processing data from within the tenant apartment for self use, such as various alarms peripherals and/or for transmitting alarm, video and data to the e-concierge station 4, the e-service provider 4A and e-merchandise provider 4B providing full flexibility for future services to be rendered by the e-concierge programs and for enhancing the shopping terminal as a versatile e-shopping tool.

Figure 9:
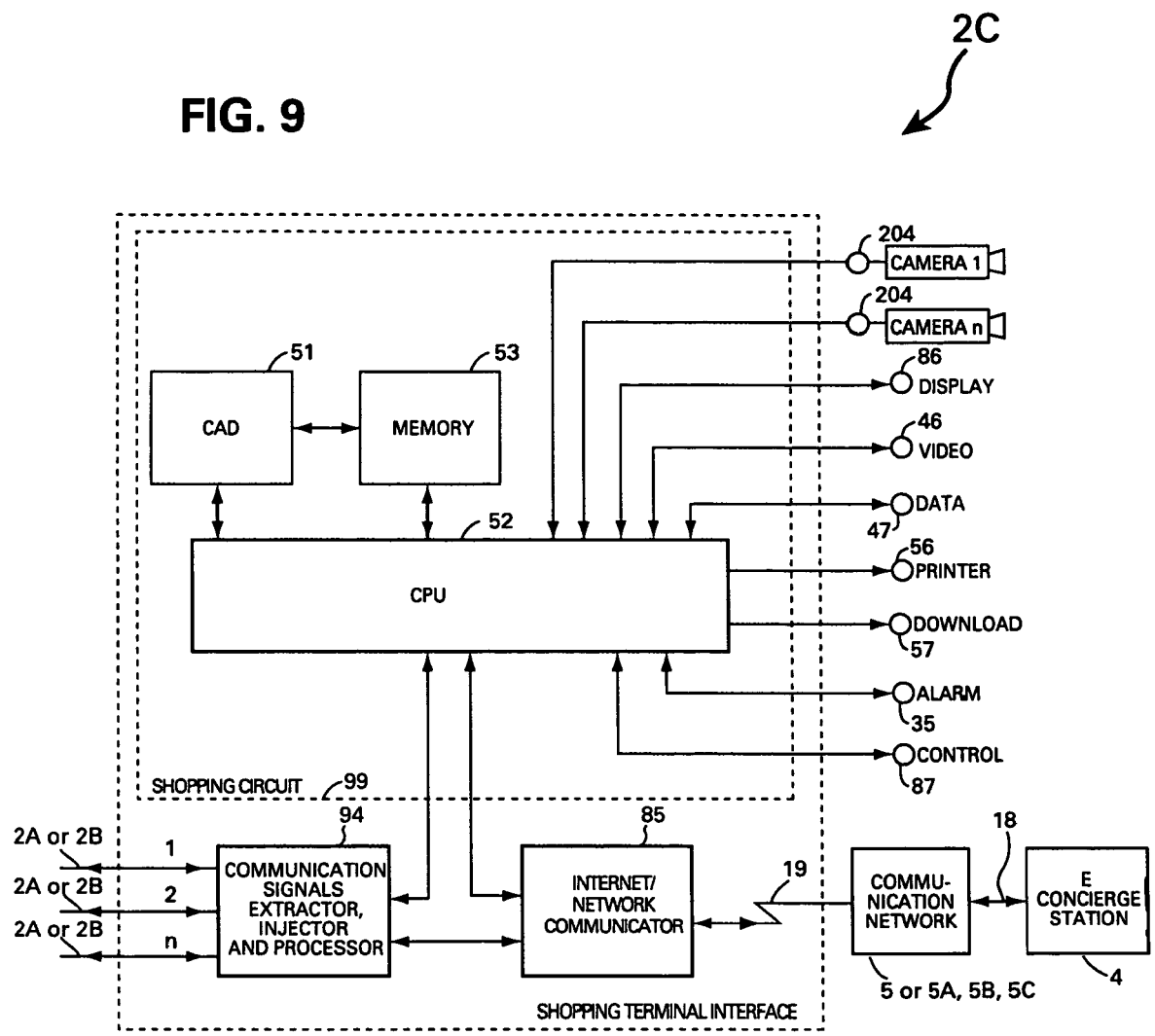
FIG. 9 is a block diagram of the electric circuit of an interface unit for interfacing shopping terminals with an e-concierge station via a communication network.

The CPU 52 of the shopping terminals 2 and 2-1 processes the audio, video, alarm, control, command and data signals and feeds or receives processed signals through the communication signal processor 59, which can process and output identical signals with the signals generated by the television interphone monitors 1, 1-1 and 1-2, in which case the transmission lines 2A or 2B may be a low cost twisted pair and will be connected to the shopping terminal interface 2C having its communication signal extractor, injector and processor 94 of FIG. 9 similar to the communication signals extractor, injector and processor 84 of the video interphone interface 1C of FIG. 8.

The communication signal processor 59 can also generate serial communication signals, compressed or non compressed, or it can interface and configure the signals to communicate with well known LAN, WAN, ADSL, ATM or other well known or proprietary network signals and feed the interfaced signals or receive interfaced signals through the transmission lines 2A via well known network hub 2D shown in FIG. 1, in which case the signals extractor, injector and processor 94 of the shopping terminal interface 2C will also process and propagate the interfaced two way signals compatible with the well known LAN, WAN, ADSL, ATM or other well known or proprietary network signals.

FIG. 1 shows a single shopping terminal 2-1 that is directly connected to the network 5A, but can be connected to the network 5B, 5C or to the internet network 5. The communication signals processor 59 of the shown shopping terminal 2-1 of FIG. 6 that is directly connected to a network will process and interface the two way propagated shopping signals, similar to the processor 94 of the shopping terminal interface 2C discussed above, to be compatible with the well known LAN, WAN, ADSL, ATM or other well known or proprietary network signals, thereby enabling the shopping terminal 2-1 to become a stand alone shopping terminal, for installation in private houses, without the need to connect and operate the shopping terminal through a shopping terminal interface 2C, which will be unnecessarily costlier for a private house.

The communication signals extractor, injector and processor 84 of the video interphone interface 1C shown in FIG. 8 is connected to n number of transmission lines 17. The number of lines 17 is selected to provide sufficient capacity for n number of tenants to communicate with the e-concierge station 4, the e-service 4A and e-merchandise 4B providers simultaneously. The concurrent, or the simultaneous communication by several tenants with the e-concierge, e-service and e-merchandise providers are limited to the number of communication channels provided by the matrix selector 1B of the video interphone systems as shown in FIG. 1. Full descriptions of the matrix selector are not provided here, as the matrix selector 1B is fully disclosed in the above-mentioned U.S. Pat. No. 6,603,842.

It is clear, however, that with more communication channels provided to the video interphone system, a faster access and improved capacity will become available to more tenants for engaging without delay the e-concierge station 4, the e-services 4A and e-merchandise 4B providers.

With reference to FIG. 9 which shows the electric circuit of the interface unit, the interface 2C of the shopping terminal includes a communication signals extractor, injector and processor 94 which incorporates n number of input terminals for connecting n number of transmission lines 2B. It is shown in FIG. 1 that the shopping terminal interfaces 2C are connected to n number of shopping terminals 2 directly via n number of transmission lines 2B, or via a single transmission line 2B through the hub 2D and n number of transmission lines 2A. This arrangement of connecting n lines 2A or 2B to either the hub 2D or directly to the shopping terminal interface 2C can be reversed or intermixed.

Shown in FIG. 5 is the shopping terminal 2 connected via transmission line 2B, which includes the feeding of regulated current via the transmission line 2B, accordingly a regulated current supply source can be connected to the transmission lines 2B within the hub 2D or within the shopping terminal interface 2C. The regulated current supply sources are not shown in FIG. 1 and FIG. 8, and the details of the known regulated current supply circuits are not explained here, as they are fully explained in U.S. Pat. No. 5,923,363 the content of which is incorporated herein by reference.

Further, the communication signal processor 59 of the shopping terminals 2 or 2-1 may communicate a processed signals combining audio, video, alarm, control, command and data similar to the signals generated by the television interphone monitors 1, 1-1 and 1-2, at which case the hub 2D of FIG. 1 or the communication signals extractor, injector and processor 94 of FIG. 9 may incorporate a matrix selector or router for connecting selectively n number of lines 2B to the extractor and injector circuits (not shown) of the communication signals extractor, injector and processor circuit 94.

When the communication signal processor 59 of the shopping terminals 2 or 2-1 of FIG. 5 and FIG. 6 communicates an interfaced shopping signals, such as data signal compatible with signals propagated via well known LAN, WAN, ADSL, ATM or other well known or proprietary network signals, the hub 2D and the hub (not shown) contained in the communication signals extractor, injector and processor 94 of FIG. 9 will route the n channels of communication lines to the extractor and injector circuit portion of circuit 94.

Similar to the communication signals extractor, injector and processor 84 of FIG. 8 the communication signals extractor, injector and processor 94 of FIG. 9 will propagate interfaced signals communicated via the communication signal processor 59 of FIG. 5 and FIG. 6, directly to the internet/network communicator circuit 85 or will divert processed signals, combining audio, video, alarm, control, command and data signals communicated via the communication signal processor 59, to the CPU 52 of FIG. 9 for reprocessing and interfacing the two way signals, so as to propagate two way interfaced signals through the internet/network communicator circuit 85, thereby providing interfacing for both, processed signals such as communicated internally by the television interphone system 1, 1-1 and 1-2 and interface signals such as are used by the well known LAN, WAN, ADSL, ATM or other well known or proprietary network signals and/or the internet.

Outside the communication signals extractor, injector and processors 84 and 94 all other circuits and programs of the video interphone interface 1C of FIG. 8 and the shopping terminal interface 2C of FIG. 9 are similar. Not shown in the television interphone interface 1C of FIG. 8 are the many connectors such as 204 for cameras, 46 for video, 47 for data, 56 for printer, 57 for download and 35 for alarm, because of many of such connection facilities are incorporated in the matrix 1B of the television interphone monitor system and/or its control PC, however, if needed all the above listed connectors can be included in the video interphone interface 1C as well. The only shown connectors in FIG. 8 are a display connector 86 for providing display signals for maintenance or for connecting the display of the interface 1C to the television interphone system and the control connector 87 that can be connected to the control network of the matrix selector 1B and/or to the controlling PC of the television interphone system (not shown).

The connectors 204 for connecting cameras, 46 for video, 47 for data, 56 for printer output, 57 for download and 35 for alarm of the shopping terminal interface 2C can be used for connecting the building itself to the e-concierge network and facilities and for providing common services to the whole or some of the tenants of a given building. The services including alarm, emergency, medical, shopping, printing of publications and news, downloading of music, movies and games or other software programs, can be therefore provided directly to the building, the whole of the tenants or some of the tenants directly through the shopping terminal interface 2C, and the video interphone interface 1C.

As explained, the CPU 52 of FIG. 8 and FIG. 9 along with the CAD 51 and their memory 53, all operate in the same way as the CPU 52, the CAD 51 and the memory 53 of the shopping circuit 50 of the television interphone monitors 1, 1-1 and 1-2 or of the shopping circuit 50A of the shopping terminals 2 and 2-1, with the exception of the memory 53 of the video interphone interface 1C and the shopping terminal interface 2C, which contains data pertaining the whole building, while the memory 53 of the shopping circuit 50 and the shopping circuit 50A contains only the data pertaining the tenant himself. The loading and updating of the memory 53 of the shopping terminal interface 2C process is identical with the loading and updating of the programs loaded and updated into the video interphone interface 1C and as explained, at random or periodically, from an e-concierge station 4 preferably during low traffic time through the internet 5 or any of the networks 5A, 5B or 5C or via a combination thereof.

By this it is becoming clear that the e-concierge 4, the e-service 4A and e-merchandise 4B providers can provide e-services and e-merchandise to tenants having television interphone monitors 1, 1-1 or 1-2 and to tenants having shopping terminals 2 and 2-1 the same way with no delays, no waiting in line and no frustrating search through a long listed web site of known search engines. It also becomes clear that controlled services within closed circuit e-commerce environment, served by providers located in the vicinity of the tenants can efficiently serve the tenants, and with the inclusion of the CAD circuit, both the tenants with television interphone monitors or tenants having shopping terminals in their apartments or houses can better select variety of goods with accuracy and precision, thereby reducing waste and improving the quality of e-merchandizing.

Figure 7A:
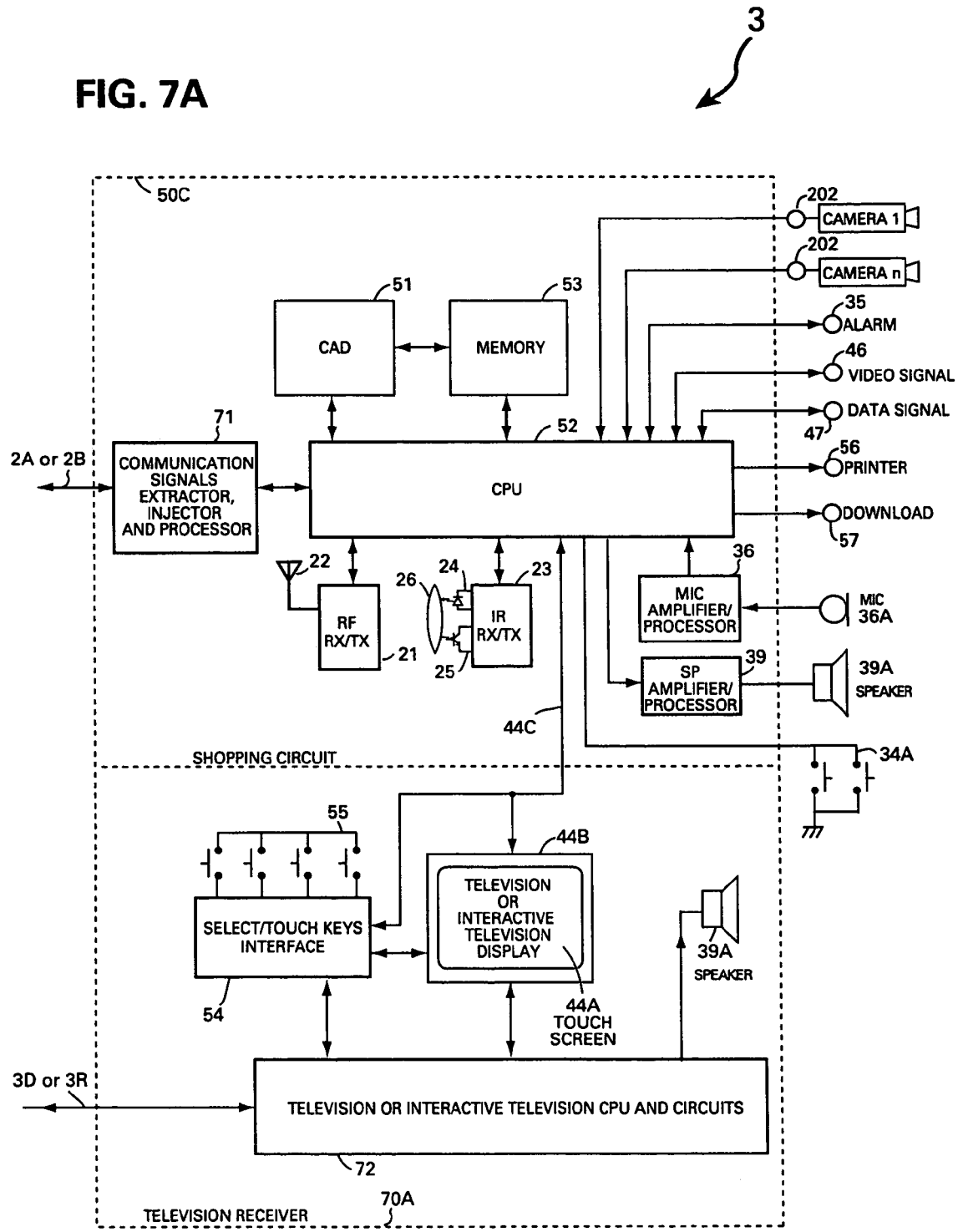
FIG. 7A is a block diagram of an electrical circuit of a television receiver, attached to a shopping circuit according to of the present invention.

Shown in FIG. 7A shows a shopping terminal 3 including a shopping circuit 50C, connected to a television receiver 70A. The shopping circuit 50C of the shopping terminal 3 is similar to the shopping circuit 50A of the shopping terminals 2 and 2-1 with the exception of the display monitor 44, the touch screen 44A, the select keys 55 and the select/touch keys interface circuit 54 shown in FIG. 5 and FIG. 6.

The display monitor 44 of the shopping terminals 2 and 2-1 is replaced with the television or interactive television display 44B of the television receiver 70A, which is adapted to include a touch screen 44A, a select keys 55 and a select/touch keys interface 54 as a built-in or add on circuit to the television receiver 70A. The line 44C shown in FIG. 7A connecting the CPU 52 of the shopping circuit 50C with the television display 44B and the select/touch keys interface 54 propagates the shopping circuit display signals and the command control alarm and data signals between the shopping circuit 50C and the television receiver 70A.

Further, the connection line 44C may connect audio and video two ways between the shopping circuit 50A and the television receiver 70A, in which case the video connector 40, the camera connectors 204, the speaker 39A and the speaker amplifier 39 of the shopping circuit 50C may not be needed and not used.

The shopping circuit 50C, similar to the shopping circuit 50A of FIG. 5 and FIG. 6, is connected to a shopping terminal interface 2C via the information transmission lines 2A or 2B, for propagating information signals including audio, video, control, command, alarm and data signals between the shopping terminal 3 and the e-concierge station 4, the e-service provider 4A and e-merchandise provider 4B provides through the shopping terminal interface 2C and the networks 5A, 5B, 5C and the internet 5, or a combination thereof as shown in FIG. 1.

The television or interactive television CPU and circuits 72 of FIG. 7A incorporates a well known remote control device, such as the remote control unit 220 of FIG. 12, for controlling and operating the television receiver, or it may incorporate other well known control and operating keys (not shown), all of which may be adapted to replace the select/touch key interface 54, thereby enabling the selection and control of both the television receiver 70A and the shopping circuit 50A.

Alternatively, the adding of a shopping circuit SOC to a television receiver 70A makes it possible to operate the shopping circuit SOC through the display 44B of the television receiver 70A and through a remote control devices such as IR or wireless remote control 220 shown in FIG. 12 through the IR transceiver 23 or the RF transceiver 21 of the shopping circuit 50A and/or by a remote control (not shown) used for operating the television receiver 70A. In addition it is possible to operate the shopping circuit 50C via the touch screen 44A or the select keys 55, which are included in the television receiver 70A or added on to the receiver in a form of a shopping adaptor box (not shown) similar to a well known boxes, such as a cable antenna box or satellite converter box.

Further, by using the well known audio and video inputs (not shown) and the speaker 39A of the television receiver 70A the shopping adaptor box (not shown) or the shopping circuit 50C can be simplified as the voice communication and video display signals can be processed through the television or interactive television CPU and circuits 72, such as making the microphone amplifier processor 36, the microphone 36A, the speaker 39A and the speaker amplifier processor 39 redundant. Similar the RF transceiver 21 and the IR transceiver 23 can be made redundant when the remote control device (not shown) of the television receiver 70A is used for remotely operating the shopping circuit 50C.

The television receiver 70A shown in FIG. 7A is connected to the cable distribution line 3D or the antenna distribution line 3R for receiving television programs, but may, as will be explained later, communicate with the interactive television interface 3C shown in FIG. 10 for connecting the shopping terminal 3 of FIG. 7A with e-concierge 4, e-service provider 4A and e-merchandise provider 4B via a communication networks 5A, 5B and 5C and via the internet 5 and a combination thereof.

Figure 7B:
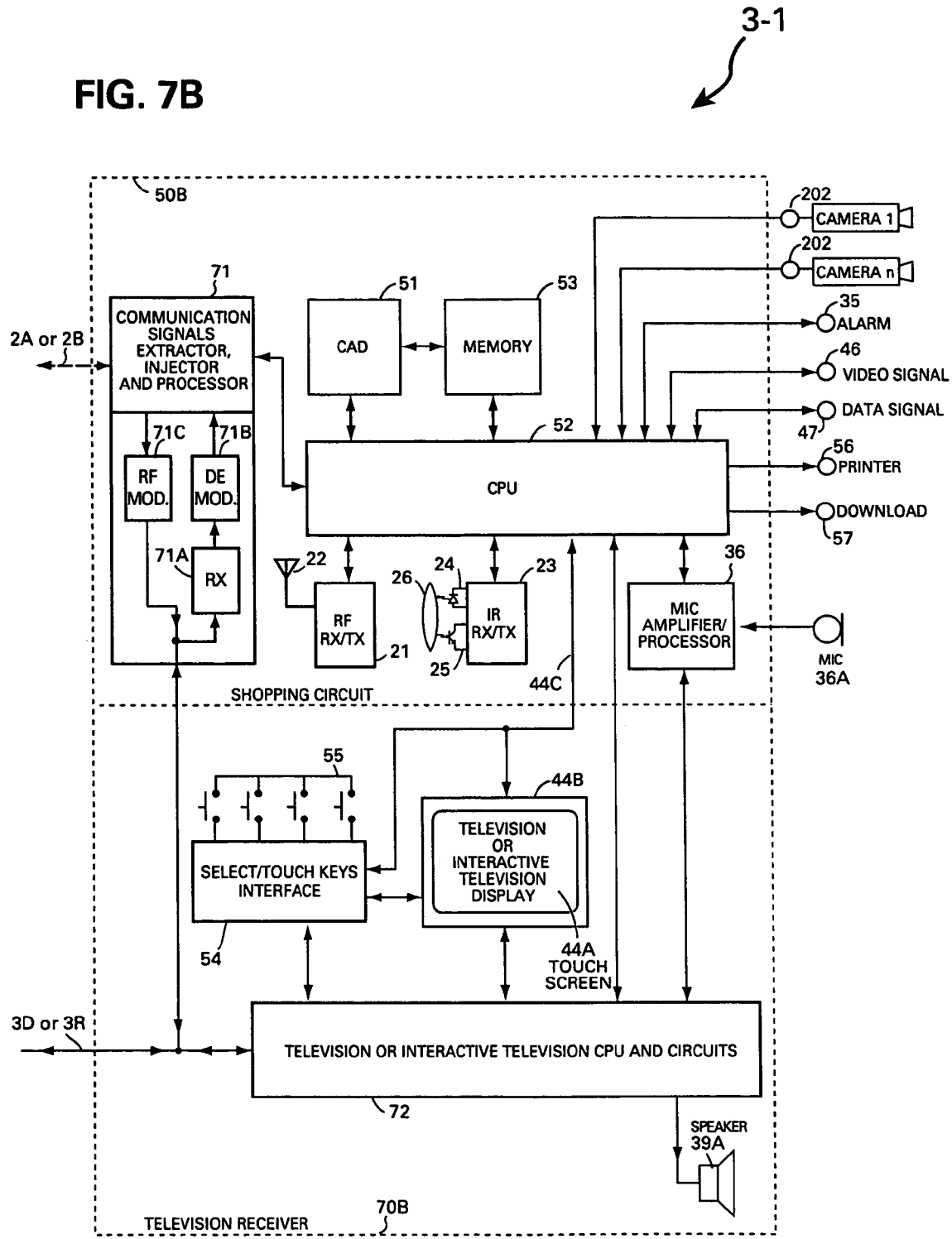
FIG. 7B is a block diagram of an electrical circuit of a television receiver, partially integrated with a shopping circuit according to of the present invention.

Shown in FIG. 7B is a shopping terminal 3-1, which utilizes a television or interactive television receiver 70B for joining and integrating the shopping circuit 50B and the television receiver 70B. Even though the shopping terminal 3-1 of FIG. 7B includes similar circuits to the circuits of the shopping terminal 3 of FIG. 7A, the expanded interconnections between the shopping circuit 50B and the television receiver 70B as shown in FIG. 7B enables further integration within the shopping terminal 3-1, thereby improving the circuit efficiency.

The CPU 52 of the shopping circuit 50B is now shown directly connected with the television or interactive television CPU and circuits 72 for improved communication and access both ways, the speaker 39A along with the speaker amplifier/processor 39 of the shopping circuit 39 of FIG. 7A are no longer used in the shopping terminal 3-1 and the microphone 36A is connected two ways to both the shopping circuit 50B and the television receiver 70B. Other redundant or duplicated circuits, such as remote control devices can be eliminated as well, the same way, as explained above for the shopping terminal 3. By such integration as shown in FIG. 7B the communication speed between the shopping circuit 50B and the television receiver 70B is improved, and the cost is reduced.

Further, the antenna distribution line 3R or the cable distribution line 3D is connected to the communication signals extractor, injector and processor 71 of the shopping circuit 50B. The communication signal extractor, injector and processor 71 combines several circuits, such as the extractor circuits 38 and 43 and the signal processor mixer and injector 32A of the video interphone circuits 1, 1-1 and 1-2, or the communication signals processor 59 of the shopping terminals 2 and 2-1. In addition the communication signals extractor, injector and processor 71 may include a well known RF signals receiver 71A and demodulator 71B for extracting the communication signals including audio, video, control, command, alarm and data signals propagated via the antenna distribution line 3R or the cable distribution line 3D, and a well known RF modulator 71C for injecting the combined processed shopping signals into the antenna distribution line 3R or the cable distribution line 3D. The RF receiver 71A and the demodulator 71B along with the RF modulator 71C are not explained here in detail as they are well known circuits for receiving, demodulating and modulating well known AM and FM signals, such as are used in television, and/or receiving, demodulating and modulating digital signals such as are used in interactive television.

Figure 10:
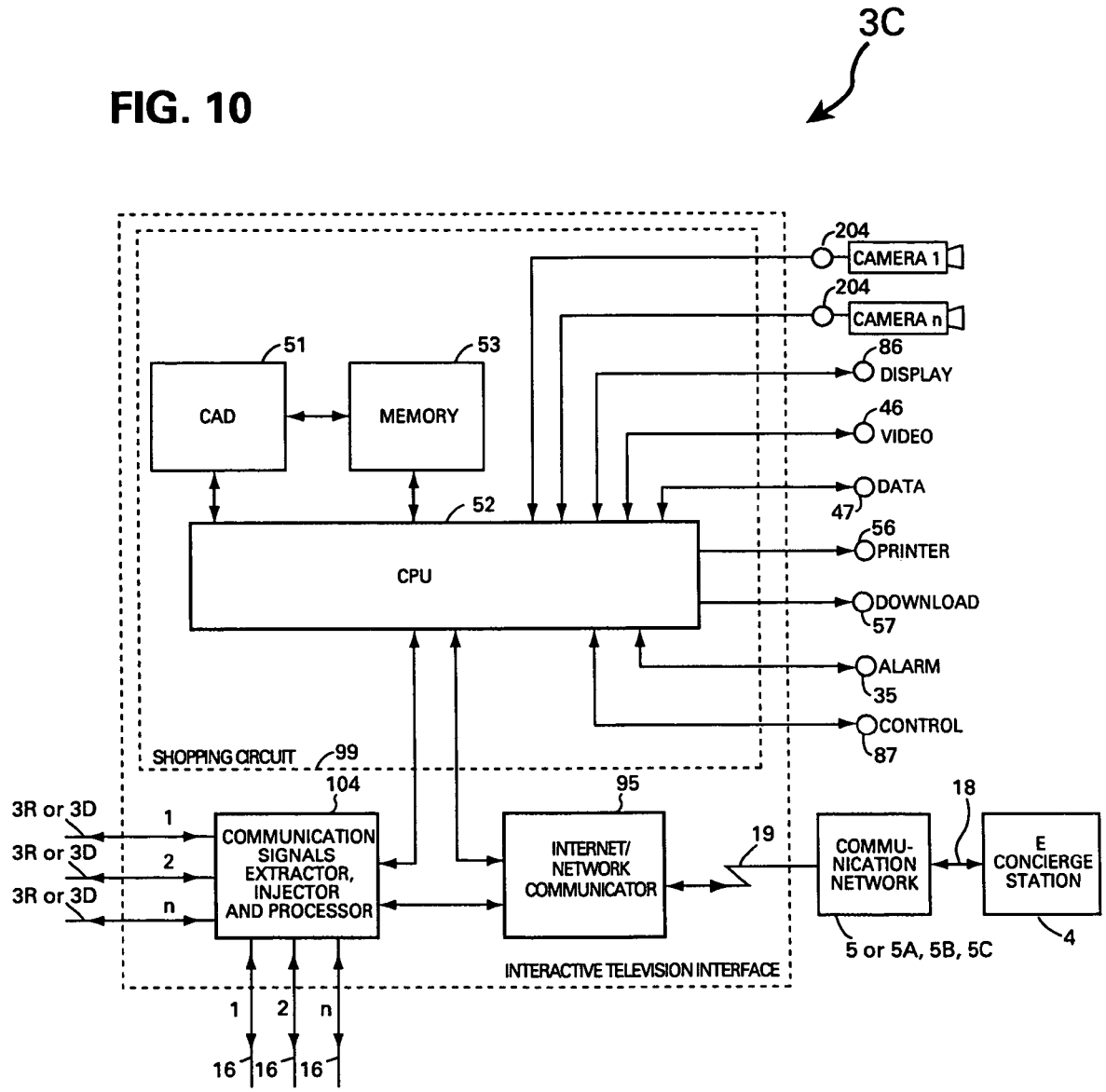
FIG. 10 is a block diagram of the electric circuit of an interface unit for interfacing interactive television with an e-commerce network via the communication network.

As shown in FIG. 10, a communication signal extractor, injector and processor 104 of the interactive television interface 3C may include reciprocal well known RF receiver 104A and demodulator 104B for extracting the shopping signals injected by the modulator 71C of the shopping terminal 3-1 and 3-2 of FIG. 7B, and a modulator 104C for injecting the shopping signals into the antenna distribution line 3R or the cable distribution line 3D for propagating the injected signals to the receiver 71A of the shopping terminals 3-1 and 3-2, thereby providing for two way or duplex reciprocal receiving, demodulating, processing and injecting of the shopping signals, propagated through the antenna distribution line 3R and the cable distribution line 3D.

To provide for multiple simultaneous channels, for propagating pluralities of shopping communication signals the receiver 71A and the receiver 104A of the shopping terminal 3-1 and 3-2 and of the interactive television interface 3C may incorporate multi channel receivers such as a well known auto tuning multi channel receiver or well known frequency scanner receiver or multiple single channel receivers 71A or 104A, along with well known multi frequency modulators 71C and 104C, or employ plurality of modulators 71C and 104C, thereby enabling to inject and receive simultaneously modulated signals via one or more antenna distribution line 3R and/or cable distribution line 3D, having different frequencies and bandwidth, commensurating with the needed bandwidth for propagating the shopping communication signals, which include audio, video, display, command, control, alarm, data and as will be explained, real time television signals as well.

It becomes therefore obvious that the shopping terminal 3-1 may communicate with the interactive television interface 3C through the antenna distribution line 3R or the cable distribution line 3D and/or through the transmission lines 2A or 2B.

Further, each of the video, display or data signals contained in the injected shopping communication signals may be assigned with an exclusive coded address, such as the well known IP address or ID code address, enabling the simultaneous propagation of multiple shopping communication signals over one frequency range or channel, and retrieve, extract and process the shopping communication signals on the basis of a decoded IP or ID address.

The communication signals extractor, injector and processor 104 of FIG. 10 is shown with "n" terminals for connecting the shopping terminals 3, 3-1 or 3-2 via transmission lines 2A or 2B, in addition to the two way propagation of the shopping communication signals via the antenna distribution line 3R and the cable distribution line 3D, the combination of which provides full flexibility in propagating the shopping communication signals between the shopping terminal 3, 3-1 and 3-2 and the interactive television interface 3C.

The e-shopping programs stored in the memory 53 of the interactive television interface may include real time, live programs for promoting certain e-merchandise and e-services for replay on the television or interactive television receivers 3, 3-1 or 3-2, providing the tenants with on-command, real time live shopping television programs, retrieved from the memory 53 and propagated through the antenna distribution line 3R or the cable distribution line 3D and with instant selection and e-shopping through the antenna distribution line 3R, the cable distribution line 3D and the information transmission line 2A or 2B.

Figure 7C:
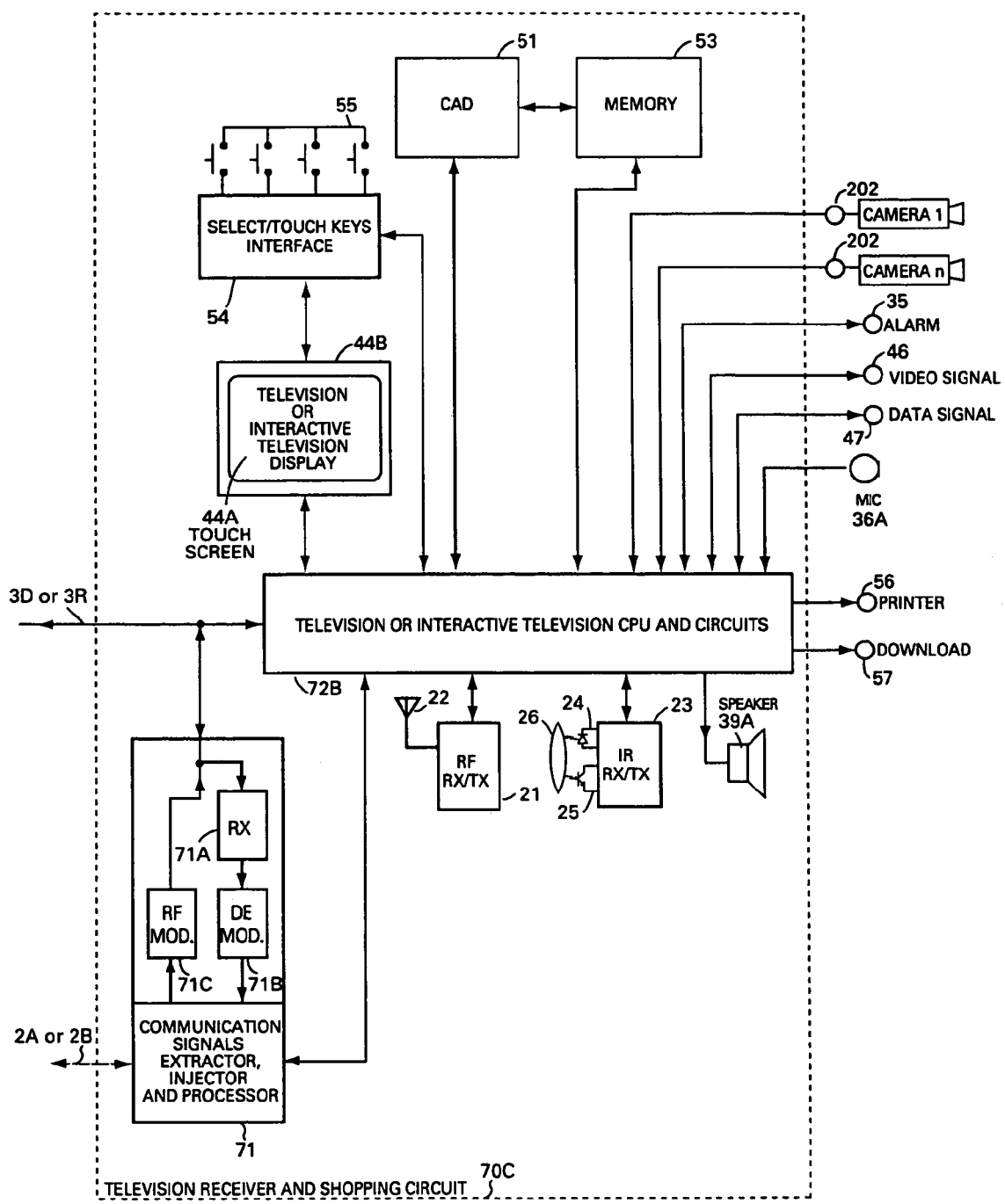
FIG. 7C is a block diagram of an electrical circuit of a television receiver fully integrated with a shopping circuit according to of the present invention.

Shown in FIG. 7C is a shopping terminal 3-2, which is a television receiver or an interactive television receiver incorporating a built-in shopping circuit including CAD circuit 51 and memory 53. The shopping terminal 3-2 uses the CPU of the television or the interactive television 72B to process also the shopping circuits, instead of using the CPU 52 of the shopping terminal 3-1 shown in FIG. 7B. Outside the using of a common CPU circuit for operating the television or the interactive television circuits and the shopping circuits of the shopping terminal 3-2, the other shopping circuits are similar to the circuits of the shopping terminal 3-1.

The shopping terminal 3-2 is connected to the transmission lines 2A or 2B and to the antenna distribution line 3R or the cable distribution line 3D, the same way the shopping terminal 3-1 is connected for propagating the two way shopping communication signals between the shopping terminal 3-2 and the interactive television interface 3C shown in FIG. 10. Accordingly, the shopping terminal 3-2, which is fully integrated or built into a television or interactive television set 70C is operated and controlled the same as all the other shopping terminals 1, 1-1, 1-2, 2, 2-1, 3 and 3-1 are operated and controlled.

Similarly, the interactive television interface 3C of FIG. 10 is constructed and operated the same way as the video interphone interface 1C and the shopping terminal interface 2C, with the exception of the communication signals extractor, injector and processor 84, 94 and 104 of FIG. 8, FIG. 9 and FIG. 10, each adapted, as explained above, to receive, retrieve, process and inject signals commensurating with the internal transmission lines 2A, 2B, 3R, 3D or 17 and with the type of shopping terminal 1, 1-1, 1-2, 2, 2-1, 3, 3-1 and 3-2 used.

It is also possible to combine the different receiving and injecting circuits 84, 94 and 104 into a single combined circuit, for providing an interface (not shown) common to all the referred above types of shopping terminals, enabling the connection of variety of shopping terminals within a building, providing the tenants of a building a selection of a shopping terminals of their choice.

It becomes further clear that the shopping terminals of this invention, regardless if the shopping terminal is a video interphone monitor or a television receiver or interactive television receiver or a dedicated shopping terminal, can be used for e-shopping within a registered and secured closed circuit e-concierge service environment, using any well known network and the internet as an infra structure for propagating data and signals, while providing e-shopping facilities within the tenant own house or apartment, enabling the tenants to select and execute orders on the basis of tailored sales programs, with no delay or queuing in line and meet the needs of every tenants community around the world and provide the most efficient e-concierge, e-service and e-merchandizing programs.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for connecting a registered e-shopping facility in a registered e-shopping environment, said e-shopping facility including a detailed software program tailored to at least one registered tenant and selected from the group comprising a programmed e-service provider, a programmed e-merchandise provider and a combination thereof, via a communication network selected from the group comprising a private network, a dedicated network, a public network, the internet and combinations thereof, with at least one e-shopping appliance including a memory and a central processing unit selected from the group comprising a television interphone monitor, a shopping terminal, a television set, an interactive television set and combinations thereof, through internal communication lines selected from the group comprising an analog communication line, a digital communication line, a network line, a cable television line, a television antenna line and a combination thereof and through at least one interface unit selected from the group comprising a television interphone monitor interface, a shopping terminal interface, an interactive television interface and combinations thereof, the method comprising the steps of:
   a) registering said tenant and said e-shopping facility with at least one registration facility selected from a group comprising a local service facility, a registration center and a combination thereof and installing into said memory a detailed tenant program complementing said detailed software program, selected from a group comprising an e-shopping operating tenant program, a tenant accounting program, a tenant payment program, an e-service tenant program, an e-merchandise tenant program, a television merchandising tenant program, a television service tenant program, an interactive television merchandising tenant program, an interactive television service tenant program, a local service tenant program, a local merchandise tenant program and combinations thereof;
   b) operating said e-shopping appliance for selecting, processing and executing an order on the basis of said detailed tenant programs;
   c) generating a shopping signal of said order selected from a group comprising television signal, interactive television signal, video signal, audio signal, control signal, command signal, alarm signal, data signal and combinations thereof, for feeding said shopping signal through said internal communication lines;
   d) interfacing said shopping signal via said interface unit for propagating an interfaced shopping signal through said communication network; and
   e) communicating said interfaced shopping signal with said e-shopping facility via said communication network.

2. The method for connecting an e-shopping facility with the e-shopping appliance via a communication network according to claim 1, wherein said e-shopping appliance further includes a CAD circuit and said step of installing said e-shopping tenant program includes the installing of a CAD tenant program.

3. The method for connecting an e-shopping facility with the e-shopping appliance via a communication network according to claim 2, wherein said step of installing a CAD tenant program further include a step for updating said CAD tenant program periodically and at random through said communication network and said interface unit by an updating facility selected from a group comprising said e-shopping facility, said registration facility and a combination thereof.

4. The method for connecting an e-shopping facility with the e-shopping appliance via a communication network according to claim 3, wherein said interface unit includes a memory for storing an updated said CAD tenant program and a programmed central processing unit for providing further steps, including a step for a scheduled and random updating of said CAD tenant program and a step for buffering said interfaced shopping signal between said e-shopping appliance and said e-shopping facility.

5. The method for connecting an e-shopping facility with the e-shopping appliance via a communication network according to claim 2, wherein said interface unit is integrated into said central processing unit and said internal communication lines are internal connecting lines within said e-shopping appliance, for transforming said e-shopping appliance into a self contained e-shopping appliance.

6. The method for connecting an e-shopping facility with the e-shopping appliance via a communication network according to claim 2, wherein a regulated current for operating said e-shopping appliance and for charging a rechargeable battery associated with said e-shopping appliance is fed through said internal communication lines to said e-shopping appliance.

7. The method for connecting an e-shopping facility with the e-shopping appliance via a communication network according to claim 2, wherein said step of operating said e-shopping appliance further includes a step for executing an order on the basis of said CAD tenant program.

8. The method for connecting an e-shopping facility with the e-shopping appliance via a communication network according to claim 2, wherein said e-shopping appliance is adapted to employ at least one camera for adding convenience and accuracy for said selection and the processing of said order.

9. The method for connecting an e-shopping facility with the e-shopping appliance via a communication network according to claim 1, wherein said step of installing said e-shopping tenant program further includes a step for updating said e-shopping tenant program periodically and at random through said communication network and said interface unit by an updating facility selected from a group comprising said e-shopping facility, said registration facility and a combination thereof.

10. The method for connecting an e-shopping facility with the e-shopping appliance via a communication network according to claim 9, wherein said interface unit includes a memory for storing updated said e-shopping tenant programs and a programmed central processing unit for providing further steps, including a step for a scheduled and random updating of said e-shopping tenant programs and a step for buffering said interfaced shopping signal between said e-shopping appliance and said e-shopping facility.

11. The method for connecting an e-shopping facility with the e-shopping appliance via a communication network according to claim 1, wherein said interface unit is integrated into said central processing unit and said internal communication lines are internal connecting lines within said e-shopping appliance, for transforming said e-shopping appliance into a self contained e-shopping appliance.

12. The method for connecting an e-shopping facility with the e-shopping appliance via a communication network according to claim 1, wherein a regulated current for operating said e-shopping appliance and for charging a rechargeable battery associated with said e-shopping appliance is fed through said internal communication lines to said e-shopping appliance.

13. The method for connecting an e-shopping facility with the e-shopping appliance via a communication network according to claim 1, wherein said step of operating said e-shopping appliance further includes a step for generating an engage command for engaging said e-shopping facility and said step of communicating said interfaced shopping signal includes two way voice communication between said e-shopping appliance and said e-shopping facility.

14. The method for connecting an e-shopping facility with the e-shopping appliance via a communication network according to claim 1, wherein said e-shopping appliance is adapted to employ at least one camera for transforming the display of said e-shopping appliance into a virtual mirror.

15. The method for connecting an e-shopping facility with the e-shopping appliance via a communication network according to claim 1, wherein said step of operating said e-shopping appliance is carried out through a control facility selected from the group comprising an IR remote control, an RF wireless remote control, a touch screen, select keys, a mouse, a voice activated program, alarm sensors, alarm switches, emergency switches, input of a command data and combinations thereof.

16. The method for connecting an e-shopping facility with the e-shopping appliance via a communication network according to claim 1, wherein said e-shopping appliance is adapted to employ a printer for printing hard copies selected from the group comprising periodicals, magazines, newspapers, advertisements, catalogs, manuals, pictures, invitations, sales offers, orders, order confirmations, invoices, bills, payments, receipts, reports, balances, mail and combinations thereof, provided by said e-shopping facility.

17. The method for connecting an e-shopping facility with the e-shopping appliance via a communication network according to claim 1, wherein said e-shopping appliance includes a downloading terminal for downloading programs, including programs selected from the group comprising music, movies, games and software packages, provided by said e-shopping facility.

18. The method for connecting an e-shopping facility with the e-shopping appliance via a communication network according to claim 1, wherein said e-shopping appliance communicates with a local facility selected from said local service facility, a local merchandise provider and a combination thereof through said internal communication lines.

19. The method for connecting an e-shopping facility with the e-shopping appliance via a communication network according to claim 1, wherein said registration center includes registration and control facilities selected from a group comprising a private center, a dedicated center, a public center, a local area center, a wide area center, a town center, a city center, a state center, a country center, a national center, a continent center, a global center and combinations thereof.

20. An apparatus for connecting a registered e-shopping facility in a registered e-shopping circuit, said e-shopping facility including detailed software program tailored to at least one registered tenant and selected from the group comprising a programmed e-service provider, a programmed e-merchandise provider and a combination thereof, via a communication network selected from the group comprising a private network, a dedicated network, a public network, the internet and combinations thereof, with at least one registered e-shopping appliance selected from the group comprising a television interphone monitor, a shopping terminal, a television set, an interactive television set and combinations thereof, through internal communication lines selected from the group comprising an analog communication line, a digital communication line, a network line, a cable television line, a television antenna line and a combination thereof and through at least one interface unit selected from the group comprising a television interphone monitor interface, a shopping terminal interface, an interactive television interface and combinations thereof;

wherein an e-concierge program for communicating with local concierge and e-shopping tenant programs, complementary programmed for operating with said detailed software including said registered e-shopping circuit includes a registering facility selected from a group comprising a local service facility, a registration center and a combination thereof;

said e-shopping appliance includes a central processing unit and a memory for registering with said registering facility and installing a detailed tenant program complementing said detailed software programs, selected from the group comprising an e-shopping operating tenant program, a tenant accounting program, a tenant payment program, an e-service tenant program, an e-merchandise tenant program, a television merchandising tenant program, a television service tenant program, an interactive television merchandising tenant program, an interactive television service tenant program, a local service tenant program, a local merchandise tenant program and combinations thereof, for selecting, processing and executing an order and generating shopping signals of said order;

and said internal communication lines are fed with said shopping signals selected from a group comprising television signal, interactive television signal, video signal, audio signal, control signal, command signal, alarm signal, data signal and combinations thereof for communicating between said e-shopping appliance and said interface unit; and said interface unit interfaces said shopping signals for communicating an interfaced shopping signals between said e-shopping appliance and said e-shopping facility through said communication network.

21. The apparatus for connecting an e-shopping facility with the e-shopping appliance via a communication network according to claim 20, wherein said e-shopping appliance further includes a CAD circuit and said e-shopping tenant programs includes a CAD tenant program.

22. The apparatus for connecting an e-shopping facility with the e-shopping appliance via a communication network according to claim 21, wherein said CAD tenant program is updated periodically and at random through said communication network and said interface unit by an updating facility selected from a group comprising said e-shopping facility, said registration facility and a combination thereof.

23. The apparatus for connecting an e-shopping facility with the e-shopping appliance via a communication network according to claim 22, wherein said interface unit includes a memory for storing an updated said CAD tenant program and a programmed central processing unit for providing a scheduled and random updating of said CAD tenant program and for buffering said interfaced shopping signal between said e-shopping appliance and said e-shopping facility.

24. The apparatus for connecting an e-shopping facility with the e-shopping appliance via a communication network according to claim 21, wherein said interface unit is integrated into said central processing unit and said internal communication lines are internal connecting lines within said e-shopping appliance, for transforming said e-shopping appliance into a self contained e-shopping appliance.

25. The apparatus for connecting an e-shopping facility with the e-shopping appliance via a communication network according to claim 21, wherein a regulated current for operating said e-shopping appliance and for charging a rechargeable battery associated with said e-shopping appliance is fed through said internal communication lines to said e-shopping appliance.

26. The apparatus for connecting an e-shopping facility with the e-shopping appliance via a communication network according to claim 21, wherein said e-shopping appliance includes at least one camera for adding convenience and accuracy for said selecting and said processing of said order.

27. The apparatus for connecting an e-shopping facility with the e-shopping appliance via a communication network according to claim 20, wherein said e-shopping tenant programs are updated periodically and at random through said communication network and said interface unit by an updating facility selected from a group comprising said e-shopping facility, said registration facility and a combination thereof.

28. The apparatus for connecting an e-shopping facility with the e-shopping appliance via a communication network according to claim 27, wherein said interface unit includes a memory for storing updated said e-shopping tenant programs and a programmed central processing unit for providing a scheduled and random updating of said e-shopping tenant programs and for buffering said interfaced shopping signal between said e-shopping appliance and said e-shopping facility.

29. The apparatus for connecting an e-shopping facility with the e-shopping appliance via a communication network according to claim 20, wherein said interface unit is integrated into said central processing unit and said internal communication lines are internal connecting lines within said e-shopping appliance for transforming said e-shopping appliance into a self contained e-shopping appliance.

30. The apparatus for connecting an e-shopping facility with the e-shopping appliance via a communication network according to claim 20, wherein a regulated current for operating said e-shopping appliance and for charging a rechargeable battery associated with said e-shopping appliance is fed through said internal communication lines to said e-shopping appliance.

31. The apparatus for connecting an e-shopping facility with the e-shopping appliance via a communication network according to claim 20 further includes at least one control for generating an engage command for engaging said e-shopping facility, and wherein said interfaced shopping signal includes two way voice communication between said e-shopping appliance and said e-shopping facility.

32. The apparatus for connecting an e-shopping facility with the e-shopping appliance via a communication network according to claim 20, wherein said e-shopping appliance includes at least one camera for transforming the display of said e-shopping appliance into a virtual mirror.

33. The apparatus for connecting an e-shopping facility with the e-shopping appliance via a communication network according to claim 20, wherein said central processing unit is operated through a control facility selected from the group comprising an IR remote control, an RF wireless remote control, a touch screen, select keys, function keys, a mouse, a voice activated program, alarm sensors, alarm switches, emergency switches, a command data input and combinations thereof.

34. The apparatus for connecting an e-shopping facility with the e-shopping appliance via a communication network according to claim 20, wherein said e-shopping appliance employs a printer for printing hard copies selected from the group comprising periodicals, magazines, newspapers, advertisements, catalogs, manuals, pictures, invitations, sales offers, orders, order confirmations, invoices, bills, payments, receipts, reports, balances, mail and combinations thereof, provided by said e-shopping facility.

35. The apparatus for connecting an e-shopping facility with the e-shopping appliance via a communication network according to claim 20, wherein said e-shopping appliance includes a downloading terminal for downloading programs, including programs selected from the group comprising music, movies, games and software packages, provided by said e-shopping facility.

36. The apparatus for connecting an e-shopping facility with the e-shopping appliance via a communication network according to claim 20, wherein said interactive television interface includes an RF receiver and an RF modulator for receiving and injecting television signals via said internal communication lines and for communicating, processing and interfacing said shopping signals of said e-shopping facility with said television signals of said television set.

37. The apparatus for connecting an e-shopping facility with the e-shopping appliance via a communication network according to claim 36, wherein said interactive television interface includes a memory and a central processing unit for installing television merchandising and service programs, and for processing the injection of television signals comprising said television merchandising and service programs into said internal communication lines, and for propagating said merchandising and service programs to said television set.

38. The apparatus for connecting an e-shopping facility with the e-shopping appliance via a communication network according to claim 36, wherein said television set includes a reciprocal RF modulator for modulating, injecting and propagating said shopping signal through one of said television antenna line and said cable television line to said interactive television interface.

39. The apparatus for connecting an e-shopping facility with the e-shopping appliance via a communication network according to claim 20, wherein said interactive television interface includes an RF receiver and an RF modulator for receiving and injecting interactive television signals via said internal communication lines and for communicating, processing and interfacing said shopping signals of said e-shopping facility with said interactive television signals of said interactive television set.

40. The apparatus for connecting an e-shopping facility with the e-shopping appliance via a communication network according to claim 39, wherein said interactive television interface includes a memory and a central processing unit for installing interactive television merchandising and service programs, and for processing the injection of interactive television signals comprising said interactive television merchandising and service programs into said internal communication lines, for propagating said merchandising and service programs to said interactive television set.

41. The apparatus for connecting an e-shopping facility with the e-shopping appliance via a communication network according to claim 39, wherein said interactive television set includes a reciprocal RF modulator for modulating, injecting and propagating said shopping signal through one of said television antenna line and said cable television line to said interactive television interface.

42. The apparatus for connecting an e-shopping facility with the e-shopping appliance via a communication network according to claim 20, wherein said e-shopping appliance communicates with a local facility selected from said local service facility, a local merchandise provider and a combination thereof through said internal communication lines.

43. The apparatus for connecting an e-shopping facility with the e-shopping appliance via a communication network according to claim 20, wherein said registration center includes registration and control facilities selected from a group comprising a private center, a dedicated center, a public center, a local area center, a wide area center, a town center, a city center, a state center, a country center, a national center, a continent center, a global center and combinations thereof.

* * * * *